(12) United States Patent
Dickstein et al.

(10) Patent No.: US 12,371,516 B2
(45) Date of Patent: Jul. 29, 2025

(54) AGED LANTHANIDE-BASED CATALYST SYSTEMS AND THEIR USE IN THE PREPARATION OF CIS-1,4-POLYDIENES

(71) Applicant: BRIDGESTONE CORPORATION, Tokyo (JP)

(72) Inventors: Joshua S. Dickstein, Copley, OH (US); Steven Luo, Akron, OH (US); Joshua Abell, Franklin, TN (US); Laura S. Kocsis, Copley, OH (US); Kevin Mccauley, Akron, OH (US)

(73) Assignee: Bridgestone Corporation, Chuo-ku (JP)

(*) Notice: Subject to any disclaimer, the term of this patent is extended or adjusted under 35 U.S.C. 154(b) by 0 days.

(21) Appl. No.: 18/108,778

(22) Filed: Feb. 13, 2023

(65) Prior Publication Data

US 2023/0183399 A1 Jun. 15, 2023

Related U.S. Application Data

(60) Continuation of application No. 17/016,141, filed on Sep. 9, 2020, now abandoned, which is a division of application No. 15/546,957, filed as application No. PCT/US2016/015328 on Jan. 28, 2016, now Pat. No. 10,774,162.

(60) Provisional application No. 62/108,761, filed on Jan. 28, 2015, provisional application No. 62/108,781, filed on Jan. 28, 2015, provisional application No. 62/108,899, filed on Jan. 28, 2015.

(51) Int. Cl.
| | |
|---|---|
| C08F 136/06 | (2006.01) |
| C08F 2/02 | (2006.01) |
| C08F 2/60 | (2006.01) |
| C08F 4/42 | (2006.01) |
| C08F 136/08 | (2006.01) |
| C08L 9/00 | (2006.01) |
| C08L 21/00 | (2006.01) |

(52) U.S. Cl.
CPC ............. *C08F 136/06* (2013.01); *C08F 2/02* (2013.01); *C08F 2/60* (2013.01); *C08F 4/42* (2013.01); *C08F 136/08* (2013.01); *C08L 9/00* (2013.01); *C08L 21/00* (2013.01); *C08L 2205/02* (2013.01)

(58) Field of Classification Search
None
See application file for complete search history.

(56) References Cited

U.S. PATENT DOCUMENTS

| | | | |
|---|---|---|---|
| 3,794,604 A | 2/1974 | Morford et al. | |
| 4,242,232 A | 12/1980 | Sylvester | |
| 4,260,707 A | 4/1981 | Sylvester | |
| 4,444,903 A | 4/1984 | Carbonaro | |
| 4,450,142 A | 5/1984 | Wetetings | |
| 4,461,883 A | 7/1984 | Takeuchi | |
| 4,533,711 A | 8/1985 | Takeuchi | |
| 4,575,538 A | 3/1986 | Hsieh | |
| 4,663,405 A | 5/1987 | Throckmorton | |
| 4,696,984 A | 9/1987 | Carbonaro | |
| 4,906,706 A | 3/1990 | Hattori | |
| 4,990,573 A | 2/1991 | Andreussi | |
| 5,017,539 A | 5/1991 | Jenkins | |
| 5,064,910 A | 11/1991 | Hattori | |
| 5,686,371 A | 11/1997 | Ansell | |
| 5,844,050 A | 12/1998 | Fukahori | |
| 6,197,713 B1 | 3/2001 | Lynch | |
| 6,255,416 B1 | 7/2001 | Sone | |
| 6,383,971 B1 | 5/2002 | Windisch | |
| 6,391,990 B1 | 5/2002 | Ishino | |
| 6,437,205 B1 | 8/2002 | Miller | |
| 6,482,906 B1 | 11/2002 | Tocchetto Pires | |
| 6,482,930 B1 | 11/2002 | Kwag | |
| 6,521,720 B2 | 2/2003 | Knauf | |
| 6,521,726 B1 | 2/2003 | Kimura | |
| 6,576,731 B2 | 6/2003 | Steinhauser | |
| 6,838,526 B1 | 1/2005 | Sone | |
| 6,897,270 B2 | 5/2005 | Ozawa | |
| 6,908,975 B2 | 6/2005 | Jang | |
| 6,977,281 B1 | 12/2005 | Ozawa | |
| 6,992,157 B2 | 1/2006 | Laubry | |
| 7,008,899 B2 | 3/2006 | Luo | |
| 7,078,466 B2 | 7/2006 | Balducci | |

(Continued)

FOREIGN PATENT DOCUMENTS

| | | | |
|---|---|---|---|
| DE | 19746266 A1 | 4/1999 | |
| EP | 0207558 A1 | 1/1987 | |

(Continued)

OTHER PUBLICATIONS

Z. Shen, J. Ouyang, F. Wang, Z. Hu, F. Yu, and B. Qian, Journal of Polymer Science: Polymer Chemistry Edition, 1980, vol. 18, pp. 3345-3357.

(Continued)

*Primary Examiner* — Catherine S Branch
(74) *Attorney, Agent, or Firm* — Meredith E. Hooker; Arthur M. Reginelli

(57) ABSTRACT

A method for preparing cis-1,4-polydienes, the method comprising the steps of preparing a preformed, active lanthanide-based catalyst, aging the active lanthanide-based catalyst for more than 5 days to thereby formed an aged catalyst, and introducing the aged catalyst and conjugated diene monomer to be polymerized to thereby form an active polymerization mixture in which the conjugated diene monomer is polymerized to form a polydiene having a reactive chain end.

13 Claims, No Drawings

(56) References Cited

U.S. PATENT DOCUMENTS

| | | |
|---|---|---|
| 7,094,849 B2 | 8/2006 | Luo |
| 7,288,611 B2 | 10/2007 | Jiang |
| 7,396,889 B2 | 7/2008 | Pierre |
| 7,741,418 B2 | 6/2010 | Luo |
| 7,825,201 B2 | 11/2010 | Luo |
| 7,968,652 B2 | 6/2011 | Kurazumi |
| 8,846,837 B2 | 9/2014 | Kloppenburg |
| 9,040,644 B2 | 5/2015 | Canivet |
| 9,090,637 B2 | 7/2015 | Thuilliez |
| 9,284,385 B2 | 3/2016 | Kloppenburg et al. |
| 2003/0187162 A1 | 10/2003 | Rachita |
| 2004/0030071 A1 | 2/2004 | Windisch et al. |
| 2004/0102589 A1 | 5/2004 | Chan |
| 2005/0113544 A1 | 5/2005 | Jiang |
| 2005/0261453 A1 | 11/2005 | Laubry |
| 2006/0004131 A1 | 1/2006 | Ozawa |
| 2007/0149717 A1 | 6/2007 | Luo |
| 2007/0276122 A1 | 11/2007 | Luo |
| 2008/0051519 A1 | 2/2008 | Luo |
| 2008/0051552 A1 | 2/2008 | Luo |
| 2008/0146745 A1 | 6/2008 | Luo |
| 2009/0099325 A1 | 4/2009 | Luo |
| 2009/0247695 A1 | 10/2009 | Nakamura |
| 2010/0004414 A1 | 1/2010 | Luo |
| 2013/0085227 A1 | 4/2013 | Luo |
| 2013/0331507 A1 | 12/2013 | Luo |
| 2014/0011963 A1 | 1/2014 | McCauley |
| 2015/0087500 A1* | 3/2015 | Bae .................... C07F 5/003 534/16 |

FOREIGN PATENT DOCUMENTS

| | | |
|---|---|---|
| EP | 0236253 B1 | 12/1991 |
| EP | 1270612 A1 | 1/2003 |
| EP | 2650313 A1 | 10/2013 |
| GB | 1108586 A | 4/1968 |
| JP | 2003528949 A | 9/2003 |
| JP | 2010229253 A | 10/2010 |
| WO | 2011101399 A1 | 8/2011 |
| WO | 2012075964 A1 | 6/2012 |
| WO | 2012106695 A2 | 8/2012 |
| WO | 2013138270 A1 | 9/2013 |
| WO | 2016123319 A1 | 8/2016 |
| WO | 2016123370 | 8/2016 |
| WO | 2016123376 A1 | 8/2016 |

OTHER PUBLICATIONS

H. L. Hsieh, H. C. Yeh, Rubber Chemistry and Technology, 1985, vol. 58, pp. 117-145.

Quirk, R. P.; Kells, A. M.; Yunlu, K.; Cuif, J.-P. Polymer 2000, 41, 5903-5908.

Friebe, L.; Nuyken, O.; Werner, O. Neodymium Based Ziegler Catalysts—Fundamental Chemistry. Advances in Polymer Science 2006, 204, 1-154.

Zhang, Z; Cui, D.; Wang, B.; Liu, B.; Yang, Y. Struct Bond 2010, 137, 49-108.

International Report on Patentability for International Appl. No. PCT/US2016/015328, dated Jun. 8, 2016.

International Report on Patentability for International Appl. No. PCT/US2016/015411, dated Jun. 8, 2016.

International Report on Patentability for International Appl. No. PCT/US2016/015418, dated Jun. 8, 2016.

Comar Chemicals—Product Categories—Catalysts. Product Listing [online]. Comar Chemicals, 2015 [archived on Feb. 15, 2015 at wayback machine web.archive.org]. Retrieved from the internet: <URL:https://web.archive.org/web/20150215073922/https:/www.comarchemicals.com/index.php/en/about-comar-en/product-categories-en/catalysts-en.

Roland, Dieter. Superior Polybutadiene properties achieved with Breakthrough in Rare Earth Finished Catalyst Technology. Presentation at International Institute of Synthetic Rubber Producers 56th AGM, Cape Town, South Africa, [online]. Apr. 20, 2015 to Apr. 23, 2015 [retrieved on Sep. 17, 2019]. Retrieved from the Internet :< URL:http://agmdownload.weebly.com/uploads/1/4/6/3/14639552/56agmproceedings.pdf>. pp. 1-16, 106-125.

Comar Chemicals Reach Registration-Certificate COMCAT NdFC/SF; EC No. 942-526-1: Reaction products of Neodymium (III) salt of C10-branched carboxylic acid, hydrido(diisobutyl)aluminium, di-µ-chloro(chloro) triethyldialuminium and buta-1,3-diene.

Comar Chemicals Material Safety Data Sheet COMCAT Nd-FC20/G2, according to Regulation (EU) 2015/830. Date of Issue: Nov. 20, 2015, Revised Jul. 29, 2016.

Oehme A., Gebauer, K., Lechner, M.D. The Influence of ageing and polymerization conditions on the polymerization of butadiene using a neodymium catalyst system. Die Angewandte Makromolekulare Chemie 235, (1996), pp. 121-130, Nr. 4098.

Freibe, L. et al. Polymerization of 1,3-Butadiene Initiated by Neodymium Versatate/Triisobutylaluminum/Ethylaluminum Sesquichloride: Impact of the Alkylaluminum Cocatalyst Component. J Macrom Sci, Part A, vol. A41, No. 3, 2004, pp. 245-256.

Oehme A., Gebauer, U., Gehrke K., Lechner, M.D. Polymerisationszeit und Gesamtkatalysatorkonzentration verändern cis-1,4-Polybutadien, KGK Kautschuk Gummi Kunststoffe 50. Jahrgang, Nr. 2/97, 1997, pp. 82-87.

Comar Chemicals Quality Operational Procedure, Polymerization of Butadiene with Neodymium Finished catalyst. Sep. 25, 2014.

Porri et al., "Recent Developments in Lanthanide Catalysts for 1,3-Diene Polymerization," ACS Symposium Series, pp. 15-30 (1999). (Year: 1999).

Office Action dated Jun. 1, 2021 in Japanese Patent Application 2020-101768.

* cited by examiner

AGED LANTHANIDE-BASED CATALYST SYSTEMS AND THEIR USE IN THE PREPARATION OF CIS-1,4-POLYDIENES

This application is a continuation application of U.S. application Ser. No. 17/016,141 filed on Sep. 9, 2020, which is a divisional application of U.S. application Ser. No. 15/546,957 filed on Jul. 27, 2017 and now issued as U.S. Pat. No. 10,774,162, which is a National-Stage application of PCT/US2016/015328 filed on Jan. 28, 2016, which claims the benefit of U.S. provisional application No. 62/108,761 filed on Jan. 28, 2015, U.S. provisional application No. 62/108,781 filed on Jan. 28, 2015, and U.S. provisional application No. 62/108,899 filed on Jan. 28, 2015, which are incorporated herein by reference.

FIELD OF THE INVENTION

Embodiments of the invention relate to preformed lanthanide-based catalyst systems and their use in the synthesis of cis-1,4-polydienes.

BACKGROUND OF THE INVENTION

Lanthanide-based catalyst systems are known to be useful for polymerizing conjugated diene monomers to form polydienes having high cis-1,4-linkage contents, low 1,2-linkages, narrow molecular weight distributions, and linear backbones. These cis-1,4-polydienes containing a linear backbone are believed to provide better tensile properties, higher abrasion resistance, lower hysteresis, and better fatigue resistance as compared to the cis-1,4-polydienes prepared with other catalyst systems such as titanium-, cobalt-, and nickel-based catalyst systems. Therefore, the cis-1,4-polydienes made with lanthanide-based catalysts are particularly suitable for use in tire components such as sidewalls and treads.

However, one disadvantage of the cis-1,4-polydienes prepared with lanthanide-based catalysts is the relatively high cost of the lanthanide compounds. Furthermore, high catalyst loadings of the lanthanide catalysts and high loadings of Al co-catalysts are often needed to obtain polymers with good processability. A common method to lower the amount of lanthanide catalyst is to use an aluminoxane co-catalyst. Still, the aluminoxane co-catalysts are also expensive and typically a large excess is required.

Therefore, there is a need to develop a process for producing lanthanide-based cis-1,4-polydienes with low catalyst loadings and/or low Al co-catalyst loadings to maintain the combination of high cis-1,4 content, low 1,2 content, and a linear backbone while minimizing the cost of the catalyst components.

SUMMARY OF THE INVENTION

One or more embodiments of the present invention provide a method for preparing cis-1,4-polydienes, the method comprising the steps of preparing a preformed, active lanthanide-based catalyst, aging the active lanthanide-based catalyst for more than 5 days to thereby formed an aged catalyst, and introducing the aged catalyst and conjugated diene monomer to be polymerized to thereby form an active polymerization mixture in which the conjugated diene monomer is polymerized to form a polydiene having a reactive chain end.

DETAILED DESCRIPTION OF ILLUSTRATIVE EMBODIMENTS

Embodiments of the invention are based, at least in part, on the discovery of a method for producing cis-1,4-polydienes having desirable polymer properties. According to aspects of the invention, the lanthanide-based catalyst system is pre-formed and then aged for an extended period of time. In certain embodiments, it has unexpectedly been discovered that when these catalyst compositions are aged for specified periods of time, increased functionality can be achieved. And, it has also unexpectedly been found that desirable cis-1,4-linkage content can be achieved after fairly long-term aging. Additionally, it has been unexpectedly discovered that these aged catalyst compositions can be further modified to yield desirable polymer properties. For example, it has been found that the amount of alkylating agent included within the aged catalyst system can be manipulated to yield an overall desirable balance of polymer properties while taking advantage of the benefits of long-term aging. Also, it has been found that by adding additional alkylating agent after aging, an overall desirable balance of polymer properties can also be achieved while taking advantage of the benefits of long-term aging. And, in yet other embodiments, it has been found that the addition of a Lewis acid in conjunction with a functional terminating agent yields higher chain-end functionality when the aged catalysts of this invention are employed to synthesize the polydienes.

Monomer

Examples of conjugated diene monomer include 1,3-butadiene, isoprene, 1,3-pentadiene, 1,3-hexadiene, 2,3-dimethyl 1,3-butadiene, 2-ethyl-1,3-butadiene, 2-methyl-1,3-pentadiene, 3-methyl-1,3-pentadiene, 4-methyl-1,3-pentadiene, and 2,4-hexadiene. Mixtures of two or more conjugated dienes may also be utilized in copolymerization.

Catalyst System

In one or more embodiments, the catalyst system employed in the present invention is a coordination catalyst system. In particular embodiments, the coordination catalyst system is a lanthanide-based catalyst system. In one or more embodiments, the catalyst system is a preformed lanthanide-based catalyst system.

Coordination Catalyst System

Coordination catalyst systems are generally known. The key mechanistic features of coordination polymerization have been discussed in books (e.g., Kuran, W., *Principles of Coordination Polymerization*; John Wiley & Sons: New York, 2001) and review articles (e.g., Mulhaupt, R., *Macromolecular Chemistry and Physics* 2003, volume 204, pages 289-327). Coordination catalysts are believed to initiate the polymerization of monomer by a mechanism that involves the coordination or complexation of monomer to an active metal center prior to the insertion of monomer into a growing polymer chain. An advantageous feature of coordination catalysts is their ability to provide stereochemical control of polymerizations and thereby produce stereoregular polymers. As is known in the art, there are numerous methods for creating coordination catalysts, but all methods eventually generate an active intermediate that is capable of coordinating with monomer and inserting monomer into a covalent bond between an active metal center and a growing polymer chain. The coordination polymerization of conjugated dienes is believed to proceed via π-allyl complexes as intermediates. Coordination catalysts can be one-, two-, three- or multi-component systems. In one or more embodiments, a coordination catalyst may be formed by combining a heavy metal compound (e.g., a transition metal compound or a lanthanide-containing compound), an alkylating agent (e.g., an organoaluminum compound), and optionally other co-catalyst components (e.g., a Lewis acid or a Lewis base). In one or more embodiments, the heavy metal compound may be referred to as a coordinating metal compound.

Lanthanide-Based Catalyst System

Practice of the present invention is not necessarily limited by the selection of any particular lanthanide-based catalyst system. In one or more embodiments, the catalyst systems employed include (a) a lanthanide-containing compound, (b) an alkylating agent, and (c) a halogen source. In other embodiments, a compound containing a non-coordinating anion or a non-coordinating anion precursor can be employed in lieu of a halogen source. In these or other embodiments, other organometallic compounds, Lewis bases, and/or catalyst modifiers can be employed in addition to the ingredients or components set forth above. For example, in one embodiment, a nickel-containing compound can be employed as a molecular weight regulator as disclosed in U.S. Pat. No. 6,699,813, which is incorporated herein by reference.

Lanthanide-Containing Compounds

As mentioned above, the lanthanide-based catalyst systems employed in the present invention can include a lanthanide-containing compound. Lanthanide-containing compounds useful in the present invention are those compounds that include at least one atom of lanthanum, neodymium, cerium, praseodymium, promethium, samarium, europium, gadolinium, terbium, dysprosium, holmium, erbium, thulium, ytterbium, lutetium, and didymium. In one embodiment, these compounds can include neodymium, lanthanum, samarium, or didymium. As used herein, the term "didymium" shall denote a commercial mixture of rare-earth elements obtained from monazite sand. In addition, the lanthanide-containing compounds useful in the present invention can be in the form of elemental lanthanide.

The lanthanide atom in the lanthanide-containing compounds can be in various oxidation states including, but not limited to, the 0, +2, +3, and +4 oxidation states. In one embodiment, a trivalent lanthanide-containing compound, where the lanthanide atom is in the +3 oxidation state, can be employed. Suitable lanthanide-containing compounds include, but are not limited to, lanthanide carboxylates, lanthanide organophosphates, lanthanide organophosphonates, lanthanide organophosphinates, lanthanide carbamates, lanthanide dithiocarbamates, lanthanide xanthates, lanthanide β-diketonates, lanthanide alkoxides or aryloxides, lanthanide halides, lanthanide pseudo-halides, lanthanide oxyhalides, and organolanthanide compounds.

In one or more embodiments, the lanthanide-containing compounds can be soluble in hydrocarbon solvents such as aromatic hydrocarbons, aliphatic hydrocarbons, or cycloaliphatic hydrocarbons. Hydrocarbon-insoluble lanthanide-containing compounds, however, may also be useful in the present invention, as they can be suspended in the polymerization medium to form the catalytically active species.

For ease of illustration, further discussion of useful lanthanide-containing compounds will focus on neodymium compounds, although those skilled in the art will be able to select similar compounds that are based upon other lanthanide metals.

Suitable neodymium carboxylates include, but are not limited to, neodymium formate, neodymium acetate, neodymium acrylate, neodymium methacrylate, neodymium valerate, neodymium gluconate, neodymium citrate, neodymium fumarate, neodymium lactate, neodymium maleate, neodymium oxalate, neodymium 2-ethylhexanoate, neodymium neodecanoate (a.k.a., neodymium versatate), neodymium naphthenate, neodymium stearate, neodymium oleate, neodymium benzoate, and neodymium picolinate.

Suitable neodymium organophosphates include, but are not limited to, neodymium dibutyl phosphate, neodymium dipentyl phosphate, neodymium dihexyl phosphate, neodymium diheptyl phosphate, neodymium dioctyl phosphate, neodymium bis(1-methylheptyl)phosphate, neodymium bis (2-ethylhexyl)phosphate, neodymium didecyl phosphate, neodymium didodecyl phosphate, neodymium dioctadecyl phosphate, neodymium dioleyl phosphate, neodymium diphenyl phosphate, neodymium bis(p-nonylphenyl)phosphate, neodymium butyl (2-ethylhexyl) phosphate, neodymium(1-methylheptyl) (2-ethylhexyl)phosphate, and neodymium(2-ethylhexyl) (p-nonylphenyl)phosphate.

Suitable neodymium organophosphonates include, but are not limited to, neodymium butyl phosphonate, neodymium pentyl phosphonate, neodymium hexyl phosphonate, neodymium heptyl phosphonate, neodymium octyl phosphonate, neodymium(1-methylheptyl)phosphonate, neodymium (2-ethylhexyl)phosphonate, neodymium decyl phosphonate, neodymium dodecyl phosphonate, neodymium octadecyl phosphonate, neodymium oleyl phosphonate, neodymium phenyl phosphonate, neodymium(p-nonylphenyl)phosphonate, neodymium butyl butylphosphonate, neodymium pentyl pentylphosphonate, neodymium hexyl hexylphosphonate, neodymium heptyl heptylphosphonate, neodymium octyl octylphosphonate, neodymium(1-methylheptyl) (1-methylheptyl)phosphonate, neodymium(2-ethylhexyl) (2-ethylhexyl)phosphonate, neodymium decyl decylphosphonate, neodymium dodecyl dodecylphosphonate, neodymium octadecyl octadecylphosphonate, neodymium oleyl oleylphosphonate, neodymium phenyl phenylphosphonate, neodymium(p-nonylphenyl)(p-nonylphenyl)phosphonate, neodymium butyl (2-ethylhexyl)phosphonate, neodymium (2-ethylhexyl)butylphosphonate, neodymium(1-methylheptyl) (2-ethylhexyl)phosphonate, neodymium(2-ethylhexyl) (1-methylheptyl)phosphonate, neodymium(2-ethylhexyl)(p-nonylphenyl)phosphonate, and neodymium(p-nonylphenyl) (2-ethylhexyl)phosphonate.

Suitable neodymium organophosphinates include, but are not limited to, neodymium butylphosphinate, neodymium pentylphosphinate, neodymium hexylphosphinate, neodymium heptylphosphinate, neodymium octylphosphinate, neodymium(1-methylheptyl)phosphinate, neodymium(2-ethylhexyl)phosphinate, neodymium decylphosphinate, neodymium dodecylphosphinate, neodymium octadecylphosphinate, neodymium oleylphosphinate, neodymium phenylphosphinate, neodymium (p-nonylphenyl) phosphinate, neodymium dibutylphosphinate, neodymium dipentylphosphinate, neodymium dihexylphosphinate, neodymium diheptylphosphinate, neodymium dioctylphosphinate, neodymium bis(1-methylheptyl)phosphinate, neodymium bis(2-ethylhexyl)phosphinate, neodymium didecylphosphinate, neodymium didodecylphosphinate, neodymium dioctadecylphosphinate, neodymium dioleylphosphinate, neodymium diphenylphosphinate, neodymium bis(p-nonylphenyl)phosphinate, neodymium butyl (2-ethylhexyl)phosphinate, neodymium (1-methylheptyl) (2-ethylhexyl) phosphinate, and neodymium (2-ethylhexyl) (p-nonylphenyl)phosphinate.

Suitable neodymium carbamates include, but are not limited to, neodymium dimethylcarbamate, neodymium diethylcarbamate, neodymium diisopropylcarbamate, neodymium dibutylcarbamate, and neodymium dibenzylcarbamate.

Suitable neodymium dithiocarbamates include, but are not limited to, neodymium dimethyldithiocarbamate, neodymium diethyldithiocarbamate, neodymium diisopropyldithiocarbamate, neodymium dibutyldithiocarbamate, and neodymium dibenzyldithiocarbamate.

Suitable neodymium xanthates include, but are not limited to, neodymium methylxanthate, neodymium ethylxanthate, neodymium isopropylxanthate, neodymium butylxanthate, and neodymium benzylxanthate.

Suitable neodymium β-diketonates include, but are not limited to, neodymium acetylacetonate, neodymium trifluoroacetylacetonate, neodymium hexafluoroacetylacetonate, neodymium benzoylacetonate, and neodymium 2,2,6,6-tetramethyl-3,5-heptanedionate.

Suitable neodymium alkoxides or aryloxides include, but are not limited to, neodymium methoxide, neodymium ethoxide, neodymium isopropoxide, neodymium 2-ethylhexoxide, neodymium phenoxide, neodymium nonylphenoxide, and neodymium naphthoxide.

Suitable neodymium halides include, but are not limited to, neodymium fluoride, neodymium chloride, neodymium bromide, and neodymium iodide. Suitable neodymium pseudo-halides include, but are not limited to, neodymium cyanide, neodymium cyanate, neodymium thiocyanate, neodymium azide, and neodymium ferrocyanide. Suitable neodymium oxyhalides include, but are not limited to, neodymium oxyfluoride, neodymium oxychloride, and neodymium oxybromide. A Lewis base, such as tetrahydrofuran ("THF"), may be employed as an aid for solubilizing this class of neodymium compounds in inert organic solvents. Where lanthanide halides, lanthanide oxyhalides, or other lanthanide-containing compounds containing a halogen atom are employed, the lanthanide-containing compound may optionally also provide all or part of the halogen source in the lanthanide-based catalyst system.

As used herein, the term organolanthanide compound refers to any lanthanide-containing compound containing at least one lanthanide-carbon bond. These compounds are predominantly, though not exclusively, those containing cyclopentadienyl ("Cp"), substituted cyclopentadienyl, allyl, and substituted allyl ligands. Suitable organolanthanide compounds include, but are not limited to, $Cp_3Ln$, $Cp_2LnR$, $Cp_2LnCl$, $CpLnCl_2$, $CpLn(cyclooctatetraene)$, $(C_5Me_5)_2LnR$, $LnR_3$, $Ln(allyl)_3$, and $Ln(allyl)_2Cl$, where Ln represents a lanthanide atom, and R represents a hydrocarbyl group. In one or more embodiments, hydrocarbyl groups useful in the present invention may contain heteroatoms such as, for example, nitrogen, oxygen, boron, silicon, sulfur, and phosphorus atoms.

Alkylating Agents

As mentioned above, the lanthanide-based catalyst systems employed in the present invention can include an alkylating agent. In one or more embodiments, alkylating agents, which may also be referred to as hydrocarbylating agents, include organometallic compounds that can transfer one or more hydrocarbyl groups to another metal. Generally, these agents include organometallic compounds of electropositive metals such as Groups 1, 2, and 3 metals (Groups IA, IIA, and IIIA metals). Alkylating agents useful in the present invention include, but are not limited to, organoaluminum and organomagnesium compounds. As used herein, the term organoaluminum compound refers to any aluminum compound containing at least one aluminum-carbon bond. In one or more embodiments, organoaluminum compounds that are soluble in a hydrocarbon solvent can be employed. As used herein, the term organomagnesium compound refers to any magnesium compound that contains at least one magnesium-carbon bond. In one or more embodiments, organomagnesium compounds that are soluble in a hydrocarbon can be employed. As will be described in more detail below, several species of suitable alkylating agents can be in the form of a halide. Where the alkylating agent includes a halogen atom, the alkylating agent may also serve as all or part of the halogen source in the above-mentioned catalyst system.

Organoaluminum Compounds

In one or more embodiments, organoaluminum compounds that can be utilized in the lanthanide-based catalyst system include those represented by the general formula $AlR_nX_{3-n}$, where each R independently can be a monovalent organic group that is attached to the aluminum atom via a carbon atom, where each X independently can be a hydrogen atom, a halogen atom, a carboxylate group, an alkoxide group, or an aryloxide group, and where n can be an integer in the range of from 1 to 3. In one or more embodiments, each R independently can be a hydrocarbyl group such as, for example, alkyl, cycloalkyl, substituted cycloalkyl, alkenyl, cycloalkenyl, substituted cycloalkenyl, aryl, substituted aryl, aralkyl, alkaryl, allyl, and alkynyl groups, with each group containing in the range of from 1 carbon atom, or the appropriate minimum number of carbon atoms to form the group, up to about 20 carbon atoms. These hydrocarbyl groups may contain heteroatoms including, but not limited to, nitrogen, oxygen, boron, silicon, sulfur, and phosphorus atoms.

Types of the organoaluminum compounds that are represented by the general formula $AlR_nX_{3-n}$ include, but are not limited to, trihydrocarbylaluminum, dihydrocarbylaluminum hydride, hydrocarbylaluminum dihydride, dihydrocarbylaluminum carboxylate, hydrocarbylaluminum bis(carboxylate), dihydrocarbylaluminum alkoxide, hydrocarbylaluminum dialkoxide, dihydrocarbylaluminum halide, hydrocarbylaluminum dihalide, dihydrocarbylaluminum aryloxide, and hydrocarbylaluminum diaryloxide compounds. In one embodiment, the alkylating agent can comprise trihydrocarbylaluminum, dihydrocarbylaluminum hydride, and/or hydrocarbylaluminum dihydride compounds. In one embodiment, when the alkylating agent includes an organoaluminum hydride compound, the above-mentioned halogen source can be provided by a tin halide, as disclosed in U.S. Pat. No. 7,008,899, which is incorporated herein by reference in its entirety.

Suitable trihydrocarbylaluminum compounds include, but are not limited to, trimethylaluminum, triethylaluminum, triisobutylaluminum, tri-n-propylaluminum, triisopropylaluminum, tri-n-butylaluminum, tri-t-butylaluminum, tri-n-pentylaluminum, trineopentylaluminum, tri-n-hexylaluminum, tri-n-octylaluminum, tris(2-ethylhexyl)aluminum, tricyclohexylaluminum, tris(1-methylcyclopentyl)aluminum, triphenylaluminum, tri-p-tolylaluminum, tris(2,6-dimethylphenyl)aluminum, trib enzylaluminum, diethylphenylaluminum, diethyl-p-tolylaluminum, diethylbenzylaluminum, ethyldiphenylaluminum, ethyldi-p-tolylaluminum, and ethyldib enzylaluminum.

Suitable dihydrocarbylaluminum hydride compounds include, but are not limited to, diethylaluminum hydride, di-n-propylaluminum hydride, diisopropylaluminum hydride, di-n-butylaluminum hydride, diisobutylaluminum hydride, di-n-octylaluminum hydride, diphenylaluminum hydride, di-p-tolylaluminum hydride, dibenzylaluminum hydride, phenylethylaluminum hydride, phenyl-n-propylaluminum hydride, phenylisopropylaluminum hydride, phenyl-n-butylaluminum hydride, phenylisobutylaluminum hydride, phenyl-n-octylaluminum hydride, p-tolylethylaluminum hydride, p-tolyl-n-propylaluminum hydride, p-tolylisopropylaluminum hydride, p-tolyl-n-butylaluminum hydride, p-tolylisobutylaluminum hydride, p-tolyl-n-octylaluminum hydride, b enzylethylaluminum hydride, b enzyl-n-propylaluminum hydride, benzylisopropylaluminum hydride, b enzyl-n-butylaluminum hydride, benzylisobutylaluminum hydride, and benzyl-n-octylaluminum hydride.

Suitable hydrocarbylaluminum dihydrides include, but are not limited to, ethylaluminum dihydride, n-propylaluminum dihydride, isopropylaluminum dihydride, n-butylaluminum dihydride, isobutylaluminum dihydride, and n-octylaluminum dihydride.

Suitable dihydrocarbylaluminum halide compounds include, but are not limited to, diethylaluminum chloride, di-n-propylaluminum chloride, diisopropylaluminum chloride, di-n-butylaluminum chloride, diisobutylaluminum chloride, di-n-octylaluminum chloride, diphenylaluminum chloride, di-p-tolylaluminum chloride, dibenzylaluminum chloride, phenylethylaluminum chloride, phenyl-n-propylaluminum chloride, phenylisopropylaluminum chloride, phenyl-n-butylaluminum chloride, phenylisobutylaluminum chloride, phenyl-n-octylaluminum chloride, p-tolylethylaluminum chloride, p-tolyl-n-propylaluminum chloride, p-tolylisopropylaluminum chloride, p-tolyl-n-butylaluminum chloride, p-tolylisobutylaluminum chloride, p-tolyl-n-octylaluminum chloride, benzylethylaluminum chloride, benzyl-n-propylaluminum chloride, benzylisopropylaluminum chloride, benzyl-n-butylaluminum chloride, benzylisobutylaluminum chloride, and benzyl-n-octylaluminum chloride.

Suitable hydrocarbylaluminum dihalide compounds include, but are not limited to, ethylaluminum dichloride, n-propylaluminum dichloride, isopropylaluminum dichloride, n-butylaluminum dichloride, isobutylaluminum dichloride, and n-octylaluminum dichloride.

Other organoaluminum compounds useful as alkylating agents that may be represented by the general formula $AlR_nX_{3-n}$ include, but are not limited to, dimethylaluminum hexanoate, diethylaluminum octoate, diisobutylaluminum 2-ethylhexanoate, dimethylaluminum neodecanoate, diethylaluminum stearate, diisobutylaluminum oleate, methylaluminum bis(hexanoate), ethylaluminum bis(octoate), isobutylaluminum bis(2-ethylhexanoate), methylaluminum bis(neodecanoate), ethylaluminum bis(stearate), isobutylaluminum bis(oleate), dimethylaluminum methoxide, diethylaluminum methoxide, diisobutylaluminum methoxide, dimethylaluminum ethoxide, diethylaluminum ethoxide, diisobutylaluminum ethoxide, dimethylaluminum phenoxide, diethylaluminum phenoxide, diisobutylaluminum phenoxide, methylaluminum dimethoxide, ethylaluminum dimethoxide, isobutylaluminum dimethoxide, methylaluminum diethoxide, ethylaluminum diethoxide, isobutylaluminum diethoxide, methylaluminum diphenoxide, ethylaluminum diphenoxide, and isobutylaluminum diphenoxide.

Another class of organoaluminum compounds suitable for use as an alkylating agent in the lanthanide-based catalyst system is aluminoxanes. Aluminoxanes can comprise oligomeric linear aluminoxanes, which can be represented by the general formula:

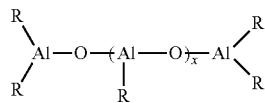

and oligomeric cyclic aluminoxanes, which can be represented by the general formula:

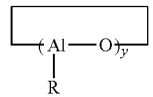

where x can be an integer in the range of from 1 to about 100, or about 10 to about 50; y can be an integer in the range of from 2 to about 100, or about 3 to about 20; and where each R independently can be a monovalent organic group that is attached to the aluminum atom via a carbon atom. In one embodiment, each R independently can be a hydrocarbyl group including, but not limited to, alkyl, cycloalkyl, substituted cycloalkyl, alkenyl, cycloalkenyl, substituted cycloalkenyl, aryl, substituted aryl, aralkyl, alkaryl, allyl, and alkynyl groups, with each group containing in the range of from 1 carbon atom, or the appropriate minimum number of carbon atoms to form the group, up to about 20 carbon atoms. These hydrocarbyl groups may also contain heteroatoms including, but not limited to, nitrogen, oxygen, boron, silicon, sulfur, and phosphorus atoms. It should be noted that the number of moles of the aluminoxane as used in this application refers to the number of moles of the aluminum atoms rather than the number of moles of the oligomeric aluminoxane molecules. This convention is commonly employed in the art of catalyst systems utilizing aluminoxanes.

Aluminoxanes can be prepared by reacting trihydrocarbylaluminum compounds with water. This reaction can be performed according to known methods, such as, for example, (1) a method in which the trihydrocarbylaluminum compound is dissolved in an organic solvent and then contacted with water, (2) a method in which the trihydrocarbylaluminum compound is reacted with water of crystallization contained in, for example, metal salts, or water adsorbed in inorganic or organic compounds, or (3) a method in which the trihydrocarbylaluminum compound is reacted with water in the presence of the monomer or monomer solution that is to be polymerized.

Suitable aluminoxane compounds include, but are not limited to, methylaluminoxane ("MAO"), modified methylaluminoxane ("MMAO"), ethylaluminoxane, n-propylaluminoxane, isopropylaluminoxane, butylaluminoxane, isobutylaluminoxane, n-pentylaluminoxane, neopentylaluminoxane, n-hexylaluminoxane, n-octylaluminoxane, 2-ethylhexylaluminoxane, cyclohexylaluminoxane, 1-methylcyclopentylaluminoxane, phenylaluminoxane, and 2,6-dimethylphenylaluminoxane. Modified methylaluminoxane can be formed by substituting about 5 to 95 percent of the methyl groups of methylaluminoxane with $C_2$ to $C_{12}$ hydrocarbyl groups, preferably with isobutyl groups, by using techniques known to those skilled in the art.

In one or more embodiments, aluminoxanes can be used alone or in combination with other organoaluminum compounds. In one embodiment, methylaluminoxane and at least one other organoaluminum compound (e.g., $AlR_nX_{3-n}$), such as diisobutyl aluminum hydride, can be employed in combination. U.S. Publication No. 2008/0182954, which is incorporated herein by reference in its entirety, provides other examples where aluminoxanes and organoaluminum compounds can be employed in combination. In one or more embodiments, the catalyst compositions employed in the present invention are devoid or substantially devoid of aluminoxanes.

Organomagnesium Compounds

As mentioned above, alkylating agents useful in the lanthanide-based catalyst system can include organomagnesium compounds. In one or more embodiments, organomagnesium compounds that can be utilized include those represented by the general formula $MgR_2$, where each R independently can be a monovalent organic group that is attached to the magnesium atom via a carbon atom. In one or more embodiments, each R independently can be a hydrocarbyl group including, but not limited to, alkyl, cycloalkyl, substituted cycloalkyl, alkenyl, cycloalkenyl, substituted cycloalkenyl, aryl, allyl, substituted aryl, aralkyl, alkaryl, and alkynyl groups, with each group containing in the range of from 1 carbon atom, or the appropriate minimum number of carbon atoms to form the group, up to about 20 carbon atoms. These hydrocarbyl groups may also contain heteroatoms including, but not limited to, nitrogen, oxygen, silicon, sulfur, and phosphorus atoms.

Suitable organomagnesium compounds that may be represented by the general formula $MgR_2$ include, but are not limited to, diethylmagnesium, di-n-propylmagnesium, diisopropylmagnesium, dibutylmagnesium, dihexylmagnesium, diphenylmagnesium, and dibenzylmagnesium.

Another class of organomagnesium compounds that can be utilized as an alkylating agent may be represented by the general formula RMgX, where R can be a monovalent organic group that is attached to the magnesium atom via a carbon atom, and X can be a hydrogen atom, a halogen atom, a carboxylate group, an alkoxide group, or an aryloxide group. Where the alkylating agent is an organomagnesium compound that includes a halogen atom, the organomagnesium compound can serve as both the alkylating agent and at least a portion of the halogen source in the catalyst systems. In one or more embodiments, R can be a hydrocarbyl group including, but not limited to, alkyl, cycloalkyl, substituted cycloalkyl, alkenyl, cycloalkenyl, substituted cycloalkenyl, aryl, allyl, substituted aryl, aralkyl, alkaryl, and alkynyl groups, with each group containing in the range of from 1 carbon atom, or the appropriate minimum number of carbon atoms to form the group, up to about 20 carbon atoms. These hydrocarbyl groups may also contain heteroatoms including, but not limited to, nitrogen, oxygen, boron, silicon, sulfur, and phosphorus atoms. In one embodiment, X can be a carboxylate group, an alkoxide group, or an aryloxide group, with each group containing in the range of from 1 to about 20 carbon atoms.

Types of organomagnesium compounds that may be represented by the general formula RMgX include, but are not limited to, hydrocarbylmagnesium hydride, hydrocarbylmagnesium halide, hydrocarbylmagnesium carboxylate, hydrocarbylmagnesium alkoxide, and hydrocarbylmagnesium aryloxide.

Suitable organomagnesium compounds that may be represented by the general formula RMgX include, but are not limited to, methylmagnesium hydride, ethylmagnesium hydride, butylmagnesium hydride, hexylmagnesium hydride, phenylmagnesium hydride, benzylmagnesium hydride, methylmagnesium chloride, ethylmagnesium chloride, butylmagnesium chloride, hexylmagnesium chloride, phenylmagnesium chloride, benzylmagnesium chloride, methylmagnesium bromide, ethylmagnesium bromide, butylmagnesium bromide, hexylmagnesium bromide, phenylmagnesium bromide, benzylmagnesium bromide, methylmagnesium hexanoate, ethylmagnesium hexanoate, butylmagnesium hexanoate, hexylmagnesium hexanoate, phenylmagnesium hexanoate, benzylmagnesium hexanoate, methylmagnesium ethoxide, ethylmagnesium ethoxide, butylmagnesium ethoxide, hexylmagnesium ethoxide, phenylmagnesium ethoxide, benzylmagnesium ethoxide, methylmagnesium phenoxide, ethylmagnesium phenoxide, butylmagnesium phenoxide, hexylmagnesium phenoxide, phenylmagnesium phenoxide, and benzylmagnesium phenoxide.

Halogen Sources

As mentioned above, the lanthanide-based catalyst systems employed in the present invention can include a halogen source. As used herein, the term halogen source refers to any substance including at least one halogen atom. In one or more embodiments, at least a portion of the halogen source can be provided by either of the above-described lanthanide-containing compound and/or the above-described alkylating agent, when those compounds contain at least one halogen atom. In other words, the lanthanide-containing compound can serve as both the lanthanide-containing compound and at least a portion of the halogen source. Similarly, the alkylating agent can serve as both the alkylating agent and at least a portion of the halogen source.

In another embodiment, at least a portion of the halogen source can be present in the catalyst systems in the form of a separate and distinct halogen-containing compound. Various compounds, or mixtures thereof, that contain one or more halogen atoms can be employed as the halogen source. Examples of halogen atoms include, but are not limited to, fluorine, chlorine, bromine, and iodine. A combination of two or more halogen atoms can also be utilized. Halogen-containing compounds that are soluble in a hydrocarbon solvent are suitable for use in the present invention. Hydrocarbon-insoluble halogen-containing compounds, however, can be suspended in a polymerization system to form the catalytically active species, and are therefore also useful.

Useful types of halogen-containing compounds that can be employed include, but are not limited to, elemental halogens, mixed halogens, hydrogen halides, organic halides, inorganic halides, metallic halides, and organometallic halides.

Suitable elemental halogens include, but are not limited to, fluorine, chlorine, bromine, and iodine. Some specific examples of suitable mixed halogens include iodine monochloride, iodine monobromide, iodine trichloride, and iodine pentafluoride.

Suitable hydrogen halides include, but are not limited to, hydrogen fluoride, hydrogen chloride, hydrogen bromide, and hydrogen iodide.

Suitable organic halides include, but are not limited to, t-butyl chloride, t-butyl bromide, allyl chloride, allyl bromide, benzyl chloride, benzyl bromide, chloro-di-phenylmethane, bromo-di-phenylmethane, triphenylmethyl chloride, triphenylmethyl bromide, benzylidene chloride, benzylidene bromide, methyltrichlorosilane, phenyltrichlorosilane, dimethyldichlorosilane, diphenyldichlorosilane, trimethylchlorosilane, benzoyl chloride, benzoyl bromide, propionyl chloride, propionyl bromide, methyl chloroformate, and methyl bromoformate.

Suitable inorganic halides include, but are not limited to, phosphorus trichloride, phosphorus tribromide, phosphorus pentachloride, phosphorus oxychloride, phosphorus oxybromide, boron trifluoride, boron trichloride, boron tribromide, silicon tetrafluoride, silicon tetrachloride, silicon tetrabromide, silicon tetraiodide, arsenic trichloride, arsenic tribromide, arsenic triiodide, selenium tetrachloride, selenium tetrabromide, tellurium tetrachloride, tellurium tetrabromide, and tellurium tetraiodide.

Suitable metallic halides include, but are not limited to, tin tetrachloride, tin tetrabromide, aluminum trichloride, aluminum tribromide, antimony trichloride, antimony pentachloride, antimony tribromide, aluminum triiodide, aluminum trifluoride, gallium trichloride, gallium tribromide, gallium triiodide, gallium trifluoride, indium trichloride, indium tribromide, indium triiodide, indium trifluoride, titanium tetrachloride, titanium tetrabromide, titanium tetraiodide, zinc dichloride, zinc dibromide, zinc diiodide, and zinc difluoride.

Suitable organometallic halides include, but are not limited to, dimethylaluminum chloride, diethylaluminum chloride, dimethylaluminum bromide, diethylaluminum bromide, dimethylaluminum fluoride, diethylaluminum fluoride, methylaluminum dichloride, ethylaluminum dichloride, methylaluminum dibromide, ethylaluminum dibromide, methylaluminum difluoride, ethylaluminum difluoride, methylaluminum sesquichloride, ethylaluminum sesquichloride, isobutylaluminum sesquichloride, methylmagnesium chloride, methylmagnesium bromide, methylmagnesium iodide, ethylmagnesium chloride, ethylmagnesium bromide, butylmagnesium chloride, butylmagnesium bromide, phenylmagnesium chloride, phenylmagnesium bromide, benzylmagnesium chloride, trimethyltin chloride, trimethyltin bromide, triethyltin chloride, triethyltin bromide, di-t-butyltin dichloride, di-t-butyltin dibromide, dibutyltin dichloride, dibutyltin dibromide, tributyltin chloride, and tributyltin bromide.

Non-Coordinating Anion/Non-Coordinating Anion Precursor

In one or more embodiments, the lanthanide-based catalyst systems can comprise a compound containing a non-coordinating anion or a non-coordinating anion precursor. In one or more embodiments, a compound containing a non-coordinating anion, or a non-coordinating anion precursor can be employed in lieu of the above-described halogen source. A non-coordinating anion is a sterically bulky anion that does not form coordinate bonds with, for example, the active center of a catalyst system due to steric hindrance. Non-coordinating anions useful in the present invention include, but are not limited to, tetraarylborate anions and fluorinated tetraarylborate anions. Compounds containing a non-coordinating anion can also contain a counter cation, such as a carbonium, ammonium, or phosphonium cation. Exemplary counter cations include, but are not limited to, triarylcarbonium cations and N,N-dialkylanilinium cations. Examples of compounds containing a non-coordinating anion and a counter cation include, but are not limited to, triphenylcarbonium tetrakis(pentafluorophenyl)borate, N,N-dimethylanilinium tetrakis(pentafluorophenyl)borate, triphenylcarbonium tetrakis[3,5-bis(trifluoromethyl)phenyl]borate, and N,N-dimethylanilinium tetrakis[3,5-bis(trifluoromethyl)phenyl]borate.

A non-coordinating anion precursor can also be used in this embodiment. A non-coordinating anion precursor is a compound that is able to form a non-coordinating anion under reaction conditions. Useful non-coordinating anion precursors include, but are not limited to, triarylboron compounds, BR3, where R is a strong electron-withdrawing aryl group, such as a pentafluorophenyl or 3,5-bis(trifluoromethyl)phenyl group.

The lanthanide-based catalyst composition used in this invention may be formed by combining or mixing the foregoing catalyst ingredients. Although one or more active catalyst species are believed to result from the combination of the lanthanide-based catalyst ingredients, the degree of interaction or reaction between the various catalyst ingredients or components is not known with any great degree of certainty. Therefore, the term "catalyst composition" has been employed to encompass a simple mixture of the ingredients, a complex of the various ingredients that is caused by physical or chemical forces of attraction, a chemical reaction product of the ingredients, or a combination of the foregoing.

Amounts

The foregoing lanthanide-based catalyst composition may have high catalytic activity for polymerizing conjugated dienes into cis-1,4-polydienes over a wide range of catalyst concentrations and catalyst ingredient ratios. Several factors may impact the optimum concentration of any one of the catalyst ingredients. For example, because the catalyst ingredients may interact to form an active species, the optimum concentration for any one catalyst ingredient may be dependent upon the concentrations of the other catalyst ingredients.

In one or more embodiments, the molar ratio of the alkylating agent to the lanthanide-containing compound (alkylating agent/Ln) can be varied from about 1:1 to about 1000:1, in other embodiments from about 2:1 to about 500:1, and in other embodiments from about 5:1 to about 200:1.

The molar ratio of the halogen-containing compound to the lanthanide-containing compound is best described in terms of the ratio of the moles of halogen atoms in the halogen source to the moles of lanthanide atoms in the lanthanide-containing compound (halogen/Ln). In one or more embodiments, the halogen/Ln molar ratio can be varied from about 0.5:1 to about 20:1, in other embodiments from about 1:1 to about 10:1, and in other embodiments from about 2:1 to about 6:1.

In yet another embodiment, the molar ratio of the non-coordinating anion or non-coordinating anion precursor to the lanthanide-containing compound (An/Ln) may be from about 0.5:1 to about 20:1, in other embodiments from about 0.75:1 to about 10:1, and in other embodiments from about 1:1 to about 6:1.

Preparation of Catalyst System

The catalyst systems employed in the present invention can be formed by various methods. In one or more embodiments, the lanthanide-based catalyst composition may be preformed. That is, the catalyst ingredients are premixed outside the polymerization system. In one or more embodiments, the premixing of the catalyst ingredients forms an active catalyst system, which is a catalyst system capable of polymerizing monomer, especially conjugated diene monomer into the desired cis-1,4-polydienes desired by one or more embodiments of this invention. Examples of useful processes for preforming a lanthanide-based catalyst composition are disclosed in U.S. Pat. Nos. 5,686,371, 6,576,731, U.S. Pat. Pub. No. 2002/0,035,226, U.S. Pat. Pub. No. 2012/0,208,964, and U.S. Pat. Pub. No. 2013/0,237,669, which are incorporated herein by reference.

Order of Addition

In one or more embodiments, the catalyst system may be formed by combining the catalyst ingredients simultaneously or sequentially. Where the ingredients are combined sequentially, the alkylating agent can be first combined with the lanthanide-containing compound, and then the mixture can be combined with the halogen source or the compound containing a non-coordinating anion or the non-coordinating anion precursor. In other embodiments, the alkylating agent and the halogen source (or non-coordinating anion or non-coordinating anion precursor) can first be combined, and then the mixture can be combined with the lanthanide-containing compound. In yet other embodiments, the lanthanide-containing compound and the halogen source (or non-coordinating anion or non-coordinating anion precursor) can first be combined, and then the mixture can be combined with the alkylating agent.

Use of Solvent

In one or more embodiments, the preformation of the catalyst may take place with a solvent. In one or more embodiments, a solvent may be employed as a carrier to either dissolve or suspend the catalyst in order to facilitate the delivery of the catalyst to the polymerization system. In other embodiments, monomer can be used as the carrier. In yet other embodiments, the catalyst can be used in their neat state without any solvent.

In one or more embodiments, suitable solvents include those organic compounds that will not undergo polymerization or incorporation into propagating polymer chains during the polymerization of monomer in the presence of the catalyst or initiator. In one or more embodiments, these organic species are liquid at ambient temperature and pressure. In one or more embodiments, these organic solvents are inert to the catalyst or initiator. Exemplary organic solvents include hydrocarbons with a low or relatively low boiling point such as aromatic hydrocarbons, aliphatic hydrocarbons, and cycloaliphatic hydrocarbons. Non-limiting examples of aromatic hydrocarbons include benzene, toluene, xylenes, ethylbenzene, diethylbenzene, and mesitylene. Non-limiting examples of aliphatic hydrocarbons include n-pentane, n-hexane, n-heptane, n-octane, n-nonane, n-decane, isopentane, isohexanes, isopentanes, isooctanes, 2,2-dimethylbutane, petroleum ether, kerosene, and petroleum spirits. And, non-limiting examples of cycloaliphatic hydrocarbons include cyclopentane, cyclohexane, methylcyclopentane, and methylcyclohexane. Mixtures of the above hydrocarbons may also be used. As is known in the art, aliphatic and cycloaliphatic hydrocarbons may be desirably employed for environmental reasons. The low-boiling hydrocarbon solvents are typically separated from the polymer upon completion of the polymerization.

Other examples of organic solvents include high-boiling hydrocarbons of high molecular weights, including hydrocarbon oils that are commonly used to oil-extend polymers. Examples of these oils include paraffinic oils, aromatic oils, naphthenic oils, vegetable oils other than castor oils, and low PCA oils including MES, TDAE, SRAE, heavy naphthenic oils. Since these hydrocarbons are non-volatile, they typically do not require separation and remain incorporated in the polymer.

Use of Stabilizers

In one or more embodiments, the catalyst system may optionally be prepared in the presence of a small amount of an alkene containing compound, which may serve to stabilize the catalyst system. Useful alkene containing compounds may include monomer as defined herein. Specific examples of suitable monomers for preforming the catalyst system include conjugated diene monomers such as 1,3-butadiene or isoprene. The amount of alkene containing compound that may be used for preforming the catalyst can range from about 1 to about 100 moles, in other embodiments from about 2.5 to about 75 moles, and in other embodiments from about 5 to about 50 moles per mole of the lanthanide-containing compound.

Conditions for Forming Catalyst System

In one or more embodiments, the catalyst systems used in this invention may be prepared at specific temperatures. In one or more embodiments, the catalyst compositions can be prepared at a temperature of at least −20° C., in other embodiments at least 0° C., in other embodiments at least 20° C., and in other embodiments at least 40° C. In these or other embodiments, the catalyst compositions can be prepared at a temperature of at most 100° C., in other embodiments at most 80° C., in other embodiments at most 60° C., in other embodiments at most 40° C., in other embodiments at most 20° C., and in other embodiments at most 0° C.

Catalyst System Aging

In one or more embodiments, the catalyst composition may be aged prior to use (i.e. prior to being added to the polymerization system).

In one or more embodiments, the catalyst composition may be aged at a temperature of at least −20° C., in other embodiments at least 0° C., in other embodiments at least 20° C., and in other embodiments at least 40° C. In these or other embodiments, the catalyst compositions may be aged at a temperature of at most 100° C., in other embodiments at most 80° C., in other embodiments at most 60° C., in other embodiments at most 40° C., in other embodiments at most 20° C., and in other embodiments at most 0° C. In certain embodiments, the catalyst composition may be aged in an environment without temperature control, where the catalyst composition would potentially be subject to varying environmental temperatures. In these or other embodiments, the catalyst composition may be aged at a temperature as described above and further aged, for at least a portion of the aging time, at an uncontrolled temperature.

In one or more embodiments, the catalyst composition may be aged for at least 1 hour, in other embodiments at least 3 hours, in other embodiments at least 6 hours, in other embodiments at least 12 hours, in other embodiments at least 24 hours, in other embodiments at least 3 days, in other embodiments at least 5 day, in other embodiments at least 6 days, in other embodiments at least 12 days, in other embodiments at least 30 days, and in other embodiments at least 60 days. In these or other embodiments, the catalyst compositions may be aged for at most 1000 days, in other embodiments at most 750 days, in other embodiments at most 500 days, in other embodiments at most 300 days, in other embodiments at most 100 days, in other embodiments at most 24 days, in other embodiments at most 18 days, and in other embodiments at most 12 days. In one or more embodiments, the catalyst composition is aged from about 4 to about 16 days, in other embodiments from about 5 to about 15 days, and in other embodiments from about 6 to about 12 days.

Specific Catalyst Systems

In one or more embodiments, the catalyst employed in the practice of this invention is a preformed catalyst that is the combination or reaction product of a lanthanide carboxylate, an aluminum hydride, and an organometallic halide. In one or more embodiments, the catalyst system may have an aluminum hydride to lanthanide carboxylate molar ratio, which is best described as a molar ratio of the moles of aluminum metal atoms in the aluminum hydride to the moles of lanthanide atoms in the lanthanide carboxylate (Al/Ln) of less than 1000:1, in other embodiments less than 500:1, and in still other embodiments less than 200:1. In these or other embodiments, the catalyst system may have an aluminum hydride to lanthanide carboxylate molar ratio (Al/Ln) of greater than 1:1, in other embodiments greater than 2:1, and in still other embodiments greater than 5:1. In certain embodiments, the catalyst system may have an aluminum hydride to lanthanide carboxylate molar ratio (Al/Ln) that is from about 1:1 to about 1000:1 in other embodiments from about 2:1 to about 500:1 and in still other embodiments from about 5:1 to about 200:1.

In those embodiments where both an aluminoxane and at least one other organoaluminum agent are employed as alkylating agents, the molar ratio of the aluminoxane to the lanthanide-containing compound (aluminoxane/Ln) can be varied from 5:1 to about 1,000:1, in other embodiments from about 10:1 to about 700:1, and in other embodiments from about 20:1 to about 500:1; and the molar ratio of the at least one other organoaluminum compound to the lanthanide-containing compound (Al/Ln) can be varied from about 1:1 to about 200:1, in other embodiments from about 2:1 to about 150:1, and in other embodiments from about 5:1 to about 100:1.

In specific embodiments, the lanthanide carboxylate is a neodymium carboxylate, the aluminum hydride is a dihydrocarbylaluminum hydride and/or hydrocarbylaluminum dihydride, and the organometallic halide is a hydrocarbyl aluminum sesquichloride. In still more specific embodiments, the catalyst system is the combination or reaction product of a neodymium neodecanoate, diisobutylaluminum hydride, and ethylaluminum sesquichloride. The catalyst system may have a diisobutylaluminum hydride to neodymium neodecanoate molar ratio from about 5 to about 40, or in other embodiments from about 10 to about 20, and an ethylaluminum sesquichloride to neodymium neodecanoate molar ratio, which is best described as a molar ratio of the moles of halogen atoms in the ethylaluminum sesquichloride to the moles of lanthanide atoms in the neodymium neodecanoate (halogen/Ln), of from about 1 to about 4, or in other embodiments from about 2 to about 3. In these or other embodiments, these specific catalyst systems may include a conjugated diene (such as 1,3-butadiene or isoprene) as a stabilizer.

Catalyst systems that may be employed in one or more embodiments of this invention are commercially available. For example, useful preformed catalyst systems are available under the tradename COMCAT Nd—FC (NH), COMCAT Nd—FC/20 (NH), COMCAT Nd—FC/SF [COMAR CHEMICALS (Pty) Ltd].

Alkylating Agent Added After Aging

In one or more embodiments, additional alkylating agent (e.g. additional alkyl aluminum hydride) is added to the catalyst composition after the catalyst composition has been aged. As suggested above, it has unexpectedly been found that the addition of alkylating agent allows for the tailoring of properties, such as the Mooney viscosity of the polydienes synthesized by using the catalyst composition. This has proven particularly beneficial in view of the fact that higher Mooney viscosities have been observed when employing aged catalyst compositions. In one or more embodiments, this additional alkylating agent is introduced to the catalyst composition prior to introducing the catalyst composition to the monomer to be polymerized (i.e. they are premixed prior to being added to the polymerization system). In other embodiments, the aged catalyst composition and the alkylating agent are added individually, either simultaneously or sequentially, to the monomer to be polymerized (i.e. the polymerization system).

The amount of alkylating agent added can vary based upon numerous factors including, but not limited to, the amount of alkylating agent present within the original catalyst composition, the length of time the catalyst is aged, the temperature at which aging took place, and the desired Mooney viscosity. In one or more embodiments, the amount of additional alkylating agent added to the catalyst composition may be described with reference to the amount of lanthanide-containing compound within the catalyst composition. In one or more embodiments, the molar ratio of the additional alkylating agent added after aging to the lanthanide-containing compound within the catalyst composition (alkylating agent/Ln) can be at least 0.1:1, in other embodiments at least 0.5:1, in other embodiments at least 1:1, and in other embodiments at least 5:1. In these or other embodiments, the molar ratio of the additional alkylating agent added after aging to the lanthanide-containing compound within the catalyst composition (alkylating agent/Ln) can be the varied from about 0.1:1 to about 100:1, in other embodiments from about 0.5:1 to about 50:1, and in other embodiments from about 0.8:1 to about 20:1. In or more embodiments, the amount of additional alkylating agent added after aging is that amount sufficient to produce a polydienes having a Mooney viscosity ($ML_{1+4}$@100° C.) of from about 10 to about 100, in other embodiments from about 20 to about 90, and in other embodiments from about 25 to about 85. In one or more embodiments, the amount of additional alkylating agent added after aging is that amount sufficient to produce a polydiene having a Mooney viscosity that is generally similar to that Mooney viscosity that would have been achieved with the same catalyst system without aging the catalyst.

In one or more embodiments, the catalyst composition, with the additional alkylating agent included therein, is introduced to monomer to be polymerized (as will be described in greater detail below) within 1 minute, in other embodiments within 15 minutes, in other embodiments within 1 hour, and in other embodiments within 24 hours of introducing the additional alkylating agent.

Polymerization Mixture

The production of the reactive polymer according to this invention can be accomplished by polymerizing conjugated diene monomer in an amount sufficient to prepare a polymer of a desired molecular weight in the presence of a catalytically effective amount of the catalyst. The introduction of the catalyst and the conjugated diene monomer forms a polymerization mixture, which may also be referred to as polymerization system, in which a reactive polymer is formed. The amount of the catalyst to be employed may depend on the interplay of various factors such as the type of catalyst or initiator employed, the purity of the ingredients, the polymerization temperature, the polymerization rate and conversion desired, the molecular weight desired, and many other factors. Accordingly, a specific catalyst or initiator amount cannot be definitively set forth except to say that catalytically effective amounts of the catalyst or initiator may be used.

In one or more embodiments, the amount of the coordinating metal compound (e.g., a lanthanide-containing compound) used can be varied from about 0.001 to about 2 mmol, in other embodiments from about 0.005 to about 1 mmol, and in still other embodiments from about 0.01 to about 0.2 mmol per 100 gram of monomer.

As indicated above, the amount of total aluminum metal employed in the catalyst system relative to the amount of monomer (e.g. 1,3-butadiene) may be limited. In one or more embodiments, the total amount of aluminum (which may be contributed by the alkylating agent and the halogen source such as ethylaluminum sesquichloride) used may be less than 5 mmol, in other embodiments less than 4.5 mmol, in other embodiments less than 4.0 mmol, in other embodiments less than 3.5 mmol, and in other embodiments less than 3.0 mmol of aluminum per 100 gram of monomer. In these or other embodiments, the total amount of aluminum used may be greater than 1 mmol, in other embodiments greater than 1.5 mmol, and in other embodiments greater than 2.0 mmol of aluminum per 100 gram of monomer. In one or more embodiments, the total amount of aluminum can be varied from about 1 to about 4.5 mmol, in other embodiments from about 1.5 to about 4.0 mmol, and in still other embodiments from about 2 to about 3.5 mmol of total aluminum per 100 gram of monomer.

In one or more embodiments, the polymerization may be carried out in a polymerization system that includes a substantial amount of solvent. In one embodiment, a solution polymerization system may be employed in which both the monomer to be polymerized and the polymer formed are soluble in the solvent. In another embodiment, a precipitation polymerization system may be employed by choosing a solvent in which the polymer formed is insoluble. In both cases, an amount of solvent in addition to the amount of solvent that may be used in preparing the catalyst or initiator is usually added to the polymerization system. The additional solvent may be the same as or different from the solvent used in preparing the catalyst or initiator. Exemplary solvents have been set forth above. In one or more embodiments, the solvent content of the polymerization mixture may be more than 20% by weight, in other embodiments more than 50% by weight, and in still other embodiments more than 80% by weight based on the total weight of the polymerization mixture.

In other embodiments, the polymerization system employed may be generally considered a bulk polymerization system that includes substantially no solvent or a minimal amount of solvent. Those skilled in the art will appreciate the benefits of bulk polymerization processes (i.e., processes where monomer acts as the solvent), and therefore the polymerization system includes less solvent than will deleteriously impact the benefits sought by conducting bulk polymerization. In one or more embodiments, the solvent content of the polymerization mixture may be less than about 20% by weight, in other embodiments less than about 10% by weight, and in still other embodiments less than about 5% by weight based on the total weight of the polymerization mixture. In another embodiment, the polymerization mixture contains no solvents other than those that are inherent to the raw materials employed. In still another embodiment, the polymerization mixture is substantially devoid of solvent, which refers to the absence of that amount of solvent that would otherwise have an appreciable impact on the polymerization process. Polymerization systems that are substantially devoid of solvent may be referred to as including substantially no solvent. In particular embodiments, the polymerization mixture is devoid of solvent.

The polymerization may be conducted in any conventional polymerization vessels known in the art. In one or more embodiments, solution polymerization can be conducted in a conventional stirred-tank reactor. In other embodiments, bulk polymerization can be conducted in a conventional stirred-tank reactor, especially if the monomer conversion is less than about 60%. In still other embodiments, especially where the monomer conversion in a bulk polymerization process is higher than about 60%, which typically results in a highly viscous cement, the bulk polymerization may be conducted in an elongated reactor in which the viscous cement under polymerization is driven to move by piston, or substantially by piston. For example, extruders in which the cement is pushed along by a self-cleaning single-screw or double-screw agitator are suitable for this purpose. Examples of useful bulk polymerization processes are disclosed in U.S. Pat. No. 7,351,776, which is incorporated herein by reference.

In one or more embodiments, all of the ingredients used for the polymerization can be combined within a single vessel (e.g., a conventional stirred-tank reactor), and all steps of the polymerization process can be conducted within this vessel. In other embodiments, two or more of the ingredients can be pre-combined in one vessel and then transferred to another vessel where the polymerization of monomer (or at least a major portion thereof) may be conducted.

The polymerization can be carried out as a batch process, a continuous process, or a semi-continuous process. In the semi-continuous process, the monomer is intermittently charged as needed to replace that monomer already polymerized. In one or more embodiments, the conditions under which the polymerization proceeds may be controlled to maintain the temperature of the polymerization mixture within a range from about −10° C. to about 200° C., in other embodiments from about 0° C. to about 150° C., and in other embodiments from about 20° C. to about 100° C. In one or more embodiments, the heat of polymerization may be removed by external cooling by a thermally controlled reactor jacket, internal cooling by evaporation and condensation of the monomer through the use of a reflux condenser connected to the reactor, or a combination of the two methods. Also, the polymerization conditions may be controlled to conduct the polymerization under a pressure of from about 0.1 atmosphere to about 50 atmospheres, in other embodiments from about 0.5 atmosphere to about 20 atmosphere, and in other embodiments from about 1 atmosphere to about 10 atmospheres. In one or more embodiments, the pressures at which the polymerization may be carried out include those that ensure that the majority of the monomer is in the liquid phase. In these or other embodiments, the polymerization mixture may be maintained under anaerobic conditions.

Functionalizing Agents

Polymerization catalyzed by a lanthanide-based catalyst produces polymers where some or all of the resulting polymer chains may possess reactive chain ends before the polymerization mixture is quenched. Thus, reference to a reactive polymer refers to a polymer having a reactive chain end. As noted above, the reactive polymer prepared with a lanthanide-based catalyst may be referred to as a pseudo-living polymer. In one or more embodiments, a polymerization mixture including reactive polymer may be referred to as an active polymerization mixture. The percentage of polymer chains possessing a reactive end depends on various factors such as the type of catalyst or initiator, the type of monomer, the purity of the ingredients, the polymerization temperature, the monomer conversion, and many other factors. In one or more embodiments, at least about 20% of the polymer chains possess a reactive end, in other embodiments at least about 50% of the polymer chains possess a reactive end, and in still other embodiments at least about 80% of the polymer chains possess a reactive end. In any event, the reactive polymer may optionally be reacted with a functionalizing agent.

In one or more embodiments, suitable functionalizing agents include those compounds that contain groups that may react with the reactive polymers produced in accordance with this invention. Exemplary functionalizing agents include ketones, quinones, aldehydes, amides, esters, isocyanates, isothiocyanates, epoxides, imines, aminoketones, aminothioketones, and acid anhydrides. Examples of these compounds are disclosed in U.S. Pat. Nos. 4,906,706, 4,990,573, 5,064,910, 5,567,784, 5,844,050, 6,838,526, 6,977,281, and 6,992,147; U.S. Pat. Publication Nos. 2006/0004131 A1, 2006/0025539 A1, 2006/0030677 A1, and 2004/0147694 A1; Japanese Patent Application Nos.

05-051406A, 05-059103A, 10-306113A, and 11-035633A; which are incorporated herein by reference. Other examples of functionalizing agents include azine compounds as described in U.S. Pat. No. 7,879,952, hydrobenzamide compounds as disclosed in U.S. Pat. No. 7,671,138, nitro compounds as disclosed in U.S. Pat. No. 7,732,534, protected oxime compounds as disclosed in U.S. Pat. No. 8,088,868, heterocyclic nitrile compounds disclosed in U.S. Pat. No. 8,314,189, halosilanes containing an amino group disclosed in U.S. Pat. No. 8,258,332, imide compounds containing a protected amino group disclosed in U.S. Pat. No. 7,906,592, nitroso compounds disclosed in U.S. Pat. Pub. No. 2010/0168378, amide containing compounds disclosed in U.S. Pat. Pub. No. 2010/0099826, carboxylic or thiocarboxylic esters containing a silylated amino group disclosed in U.S. Pat. Pub. No. 2011/0077325, polyoxime compounds disclosed in U.S. Pat. Publ No. 2011/0152449, polycyano compounds disclosed in U.S. Pat. Pub. No. 2011/0288200, nitrile compounds containing a protected amino group disclosed in U.S. Pat. Pub. No. 2012/0059112 all of which are incorporated herein by reference.

The amount of the functionalizing agent that can be added to the polymerization mixture to yield a functionalized polymer may depend on various factors including the type and amount of catalyst used to synthesize the reactive polymer and the desired degree of functionalization. In one or more embodiments, where the reactive polymer is prepared by employing a lanthanide-based catalyst, the amount of functionalizing agent employed can be described with reference to the lanthanide metal of the lanthanide-containing compound. For example, the molar ratio of the functionalizing agent to the lanthanide metal may be from about 1:1 to about 200:1, in other embodiments from about 5:1 to about 150:1, and in other embodiments from about 10:1 to about 100:1.

In one or more embodiments, the functionalizing agent may be introduced to the polymerization mixture at a location (e.g., within a vessel) where the polymerization has been conducted. In other embodiments, the functionalizing agent may be introduced to the polymerization mixture at a location that is distinct from where the polymerization has taken place. For example, the functionalizing agent may be introduced to the polymerization mixture in downstream vessels including downstream reactors or tanks, in-line reactors or mixers, extruders, or devolatilizers.

In one or more embodiments, the functionalizing agent can be reacted with the reactive polymer after a desired monomer conversion is achieved but before the polymerization mixture is quenched by a quenching agent. In one or more embodiments, the reaction between the functionalizing agent and the reactive polymer may take place within 30 minutes, in other embodiments within 5 minutes, and in other embodiments within one minute after the peak polymerization temperature is reached. In one or more embodiments, the reaction between the functionalizing agent and the reactive polymer can occur once the peak polymerization temperature is reached. In other embodiments, the reaction between the functionalizing agent and the reactive polymer can occur after the reactive polymer has been stored. In one or more embodiments, the storage of the reactive polymer occurs at room temperature or below room temperature under an inert atmosphere. In one or more embodiments, the reaction between the functionalizing agent and the reactive polymer may take place at a temperature from about 10° C. to about 150° C., and in other embodiments from about 20° C. to about 100° C. The time required for completing the reaction between the functionalizing agent and the reactive polymer depends on various factors such as the type and amount of the catalyst or initiator used to prepare the reactive polymer, the type and amount of the functionalizing agent, as well as the temperature at which the functionalization reaction is conducted. In one or more embodiments, the reaction between the functionalizing agent and the reactive polymer can be conducted for about 10 to 60 minutes.

Lewis Acid Treatment

As suggested above, in one or more embodiments, the polymerization system is treated with a Lewis acid. In one or more embodiments, a Lewis acid is introduced to the polymerization system including the reactive polymer (i.e. to the active polymerization mixture). In one or more embodiments, the introduction of the Lewis acid to the active polymerization mixture takes place after a desired monomer conversion and before the polymerization mixture is quenched by a quenching agent. In one or more embodiments, the introduction of the Lewis acid to the active polymerization mixture may take place within 2 hours, in other embodiments within 1 hour, in other embodiments within 30 minutes, in other embodiments within 5 minutes, and in other embodiments within one minute after the peak polymerization temperature is reached. In one or more embodiments, the introduction of the Lewis acid to the active polymerization mixture can occur once the peak polymerization temperature is reached. In other embodiments, the introduction of the Lewis acid to the active polymerization mixture can occur after the reactive polymer has been stored. In one or more embodiments, the storage of the reactive polymer occurs at room temperature or below room temperature under an inert atmosphere.

In one or more embodiments, the introduction of the Lewis acid is simultaneous with the introduction of the functionalizing agent. In other embodiments, the Lewis acid is introduced to the polymerization mixture after the functionalizing agent is introduced and before the polymerization mixture is quenched by a quenching agent. In one or more embodiments, the introduction of the Lewis acid to the active polymerization mixture may take place within 2 hours, in other embodiments within 1 hour, in other embodiments within 30 minutes, in other embodiments within 5 minutes, and in other embodiments within one minute after the introduction of the functionalizing agent.

In one or more embodiments, the introduction of the Lewis acid to the active polymerization mixture (or the polymerization mixture including the functionalized polymer) may take place at a temperature from about 10° C. to about 150° C., and in other embodiments from about 20° C. to about 100° C. The time required for allowing any reaction or interaction that may take place between the Lewis acid and any constituent of the polymerization mixture may depend on various factors such as the type and amount of the catalyst used to prepare the reactive polymer, the type and amount of the Lewis acid, the type and amount of functionalizing agent as well as the temperature at which the Lewis acid is introduced. In one or more embodiments, the polymerization mixture, after inclusion of the Lewis acid, may be aged for at least 5 minutes, in other embodiments at least 20 minutes, in other embodiments at least 1 hour, and in other embodiments at least 2 hours prior to any quenching of the polymerization system.

In one or more embodiments, the Lewis acid may be introduced to the polymerization mixture at a location (e.g., within a vessel) where the polymerization has been conducted. In other embodiments, the Lewis acid may be introduced to the polymerization mixture at a location that is distinct from where the polymerization has taken place. For example, the Lewis acid may be introduced to the polymerization mixture in downstream vessels including downstream reactors or tanks, in-line reactors or mixers, extruders, or devolatilizers.

In one or more embodiments, the amount of Lewis acid introduced to the polymerization system may be defined relative to the amount of lanthanide metal within the catalyst system used to prepare the polymer (e.g., atoms of neodymium). In one or more embodiments, the molar ratio of Lewis acid to lanthanide metal in the lanthanide-containing compound (LA/Ln) is at least 0.5:1, in other embodiments at least 1:1, and in other embodiments at least 5:1. In these or other embodiments, the molar ratio of Lewis acid to lanthanide metal (LA/Ln) is at most 150:1, in other embodiments at most 100:1, and in other embodiments at most 50:1. In one or more embodiments, the molar ratio LA/Ln is from about 0.5:1 to about 150:1, in other embodiments from about 1:1 to about 100:1, and in other embodiments from about 5:1 to about 50:1.

Lewis Acids

As the skilled person appreciates, Lewis acids includes those compounds that react with a Lewis base to form a Lewis adduct. According to the mechanism, the Lewis base donates a pair of electrons to the Lewis acid, which in turn accepts the electron pair. In one or more embodiments, the Lewis acid is not a Bronsted-Lowry acid, and will not have an acidic hydrogen atom.

In one or more embodiments, the Lewis acid may be selected from titanium tetraalkoxides, boron trihalides, trihydrocarbyl boranes, trihydrocarbyloxy borates, trihydrocarbylsilyl halides, trihydrocarbylsilyl triflates, silicon tetrahalides, titanium tetrahalides, aluminum trihalides, zinc dihalides, and phosphorus trihalides.

In one or more embodiments, the Lewis acid may be selected from boron trihalides, trihydrocarbyl boranes, trihydrocarbyloxy borates, trihydrocarbylsilyl halides, silicon tetrahalides, titanium tetrahalides, and phosphorus trihalides.

In one or more embodiments, the Lewis acid may be selected from boron trihalides, trihydrocarbyloxy borates, titanium tetrahalides, phosphorus trihalides.

In one or more embodiments, a boron trihalide may be defined by the formula

where each X is individually a halogen atom. Suitable halogen atoms include fluoride, chloride, and bromide. In one or more embodiments, each X may be identical. For example, when each X is a fluoride atom, the boron trihalides may be a boron trifluoride.

In one or more embodiments, a trihydrocarbyloxy borate may be defined by the formula

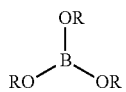

where each R is individually a monovalent organic group.

In one or more embodiments, the monovalent organic groups may include hydrocarbyl groups, which include, but are not limited to, alkyl, cycloalkyl, alkenyl, cycloalkenyl, aryl, allyl, aralkyl, alkaryl, or alkynyl groups. Hydrocarbyl groups also include substituted hydrocarbyl groups, which refer to hydrocarbyl groups in which one or more hydrogen atoms have been replaced by a substituent such as a hydrocarbyl, hydrocarbyloxy, silyl, or silyloxy group. In one or more embodiments, these groups may include from one, or the appropriate minimum number of carbon atoms to form the group, to about 20 carbon atoms. These groups may also contain heteroatoms such as, but not limited to, nitrogen, boron, oxygen, silicon, sulfur, tin, and phosphorus atoms.

In one or more embodiments, a titanium tetrahalide may be defined by the formula

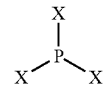

where each X is individually a halogen atom.

In one or more embodiments, a phosphorus trihalide may be defined by the formula

where each X is individually a halogen atom.

In one or more embodiments, the Lewis acid may be part of a Lewis acid-Lewis base complex. For example, the Lewis acid boron trihalide may be used as a boron trifluoride complex. Suitable Lewis bases for forming complexes include, but are not limited to, alcohols, water, mineral acids containing oxygen, water, aldehydes, amines, esters, thioesters, ethers, thioethers, ketones and nitriles.

In one or more embodiments, a ketone may be defined by the formula RCOR, where each R is independently a monovalent organic group. Representative examples of ketones suitable for use in boron trifluoride complexes include acetone, methyl ethyl ketone, dibutyl ketone, methyl isobutyl ketone, ethyl octyl ketone, 2,4-pentanedione, butyl cycloheptanone, acetophenone, amylphenyl ketone, butylphenyl ketone, benzophenone, phenyltolyl ketone, and quinone. Representative examples of boron trifluoride ketones complexes include boron trifluoride acetophenone and boron trifluoride benzophenone.

In one or more embodiments, an aldehyde may be defined by the formula RCHO, where each R is independently a monovalent organic group. Representative examples of aldehydes suitable for use in boron trifluoride complexes include butyraldehyde, anisaldehyde, cinnamic aldehyde, isobutyraldehyde, heptaldehyde, dodecylaldehyde, benzaldehyde, phenylacetaldehyde, o-tolualdehyde, m-tolualdehyde, p-tolualdehyde, m-nitrobenzaldehyde, p-nitrobenzaldehyde, and m-hydrobenzaldehyde. Representative examples of boron trifluoride aldehyde complexes include are boron trifluoride benzaldehyde and boron trifluoride tolualdehyde.

In one or more embodiments, an ester may be defined by the formula R—COOR where each R is independently a monovalent organic group. Representative examples of esters include ethyl butyrate, ethyl octanoate, isopropyl hexanoate, amyl acetate, hexyl propionate, cetyl acetate, ethyl benzoate, amyl benzoate, phenyl acetate, phenyl butyrate, and phenyl benzoate. Representative examples of boron trifluoride esters complexes include boron trifluoride ethyl benzoate, boron trifluoride ethyl acetate and boron trifluoride phenyl acetate. One skilled in the art would readily be able to prepare thioester analogs based upon the description of esters provided.

In one or more embodiments, an ether may be defined by the formula R—O—R, where each R is independently a monovalent organic group. Representative examples of ethers include ethoxybutane, butoxybutane, ethoxyoctane, isopropoxyhexane, propoxyhexane, ethoxybenzene, and amyloxybenzene. Representative examples of boron trifluoride ether complexes include boron trifluoride methyl t-butyl ether, boron trifluoride dibutyl ether, and boron trifluoride dimethyl ether. One skilled in the art would readily be able to prepare thioether analogs based upon the description of ethers provided.

In one or more embodiments, a nitrile may be represented by the formula RCN, where R is a monovalent organic group. Representative examples of nitriles include acetonitrile, butyronitrile, acrylonitrile, benzonitrile, o-tolunitrile, m-tolunitrile, p-tolunitrile, and phenylacetonitrile. Representative examples of boron trifluoride nitrile complexes include borontrifluoride benzonitrile.

Quenching

In one or more embodiments, after the reaction between the reactive polymer and the functionalizing agent has been accomplished or completed, a quenching agent can be added to the polymerization mixture in order to protonate the reaction product between the reactive polymer and the functionalizing agent, inactivate any residual reactive polymer chains, and/or inactivate the catalyst or catalyst components. The quenching agent may include a protic compound, which includes, but is not limited to, an alcohol, a carboxylic acid, an inorganic acid, water, or a mixture thereof. In particular embodiments, an alcohol, such as isopropyl alcohol, is employed since it has been observed that the use of isopropyl alcohol contributes to certain desirable properties in the final polymer, such as desirable cold flow.

In one or more embodiments, an antioxidant such as 2,6-di-tert-butyl-4-methylphenol may be added along with, before, or after the addition of the quenching agent. The amount of the antioxidant employed may be in the range of 0.2% to 1% by weight of the polymer product. Additionally, the polymer product can be oil extended by adding an oil to the polymer, which may be in the form of a polymer cement or polymer dissolved or suspended in monomer. Practice of the present invention does not limit the amount of oil that may be added, and therefore conventional amounts may be added (e.g., 5-50 phr). Useful oils or extenders that may be employed include, but are not limited to, aromatic oils, paraffinic oils, naphthenic oils, vegetable oils other than castor oils, low PCA oils including MES, TDAE, and SRAE, and heavy naphthenic oils.

Polymer Recovery

Once the polymerization mixture has been quenched, the various constituents of the polymerization mixture may be recovered. In one or more embodiments, the unreacted monomer can be recovered from the polymerization mixture. For example, the monomer can be distilled from the polymerization mixture by using techniques known in the art. In one or more embodiments, a devolatilizer may be employed to remove the monomer from the polymerization mixture. Once the monomer has been removed from the polymerization mixture, the monomer may be purified, stored, and/or recycled back to the polymerization process.

The polymer product may be recovered from the polymerization mixture by using techniques known in the art. In one or more embodiments, desolventization and drying techniques may be used. For instance, the polymer can be recovered by passing the polymerization mixture through a heated screw apparatus, such as a desolventizing extruder, in which the volatile substances are removed by evaporation at appropriate temperatures (e.g., about 100° C. to about 170° C.) and under atmospheric or sub-atmospheric pressure. This treatment serves to remove unreacted monomer as well as any low-boiling solvent. Alternatively, the polymer can also be recovered by subjecting the polymerization mixture to steam desolventization, followed by drying the resulting polymer crumbs in a hot air tunnel. The polymer can also be recovered by directly drying the polymerization mixture on a drum dryer.

Polymer Properties

In one or more embodiments, the polymers of this invention may be cis-1,4-polydienes having a cis-1,4-linkage content that is greater than 60%, in other embodiments greater than 75%, in other embodiments greater than 90%, in other embodiments greater than 95%, in other embodiments greater than 96%, in other embodiments greater than 97%, in other embodiments greater than 98%, and in other embodiments greater than 99%, where the percentages are based upon the number of diene mer units adopting the cis-1,4 linkage versus the total number of diene mer units. Also, these polymers may have a 1,2-linkage content that is less than 7%, in other embodiments less than 5%, in other embodiments less than 2%, and in other embodiments less than 1%, where the percentages are based upon the number of diene mer units adopting the 1,2-linkage versus the total number of diene mer units. The balance of the diene mer units may adopt the trans-1,4-linkage. The cis-1,4-, 1,2-, and trans-1,4-linkage contents can be determined by infrared spectroscopy.

In one or more embodiments, the number average molecular weight ($M_n$) of the cis-1,4-polydienes of this invention may be from about 1,000 to about 1,000,000, in other embodiments from about 5,000 to about 200,000, in other embodiments from about 25,000 to about 150,000, and in other embodiments from about 50,000 to about 120,000, as determined by using gel permeation chromatography (GPC) calibrated with polystyrene standards and Mark-Houwink constants for the polymer in question. The molecular weight distribution or polydispersity ($M_w/M_n$) of the cis-1,4-polydienes of this invention may be from about 1.5 to about 5.0, and in other embodiments from about 2.0 to about 4.0. In these or other embodiments, the cis-1,4-polydienes of this invention may have a $M_w/M_n$ of less than 3.0, in other embodiments less than 2.5, in other embodiments less than 2.3, in other embodiments less than 2.2, in other embodiments less than 2.1, and in other embodiments less than 2.0.

In one or more embodiments, a functional group may be imparted on a polymer chain possessing reactive chain end by treating a reactive polymer with a functionalizing agent. The percentage of polymer chains possessing a functional end group depends on various factors such as the type of catalyst or initiator, the type of monomer, the purity of the ingredients, the polymerization temperature, the monomer conversion, and many other factors. In one or more embodiments, at least about 10% of the polymer chains possess a functional end group, in other embodiments at least about 20% of the polymer chains possess a functional end group, in other embodiments at least about 30% of the polymer chains possess a functional end group, in other embodiments at least about 40% of the polymer chains possess a functional end group, in other embodiments at least about 50% of the polymer chains possess a functional end group, and in still other embodiments at least about 60% of the polymer chains possess a functional end group. In any event, the reactive polymer can be reacted with a protected oxime compound containing a cyano group.

INDUSTRIAL APPLICATION

Advantageously, the polymers of this invention are particularly useful in preparing rubber compositions that can be used to manufacture tire components. Rubber compounding techniques and the additives employed therein are generally disclosed in *The Compounding and Vulcanization of Rubber, in Rubber Technology* ($2^{nd}$ Ed. 1973).

The rubber compositions can be prepared by using the polymers alone or together with other elastomers (i.e., polymers that can be vulcanized to form compositions possessing rubbery or elastomeric properties). Other elastomers that may be used include natural and synthetic rubbers. The synthetic rubbers typically derive from the polymerization of conjugated diene monomer, the copolymerization of conjugated diene monomer with other monomer such as vinyl-substituted aromatic monomer, or the copolymerization of ethylene with one or more α-olefins and optionally one or more diene monomers.

Exemplary elastomers include natural rubber, synthetic polyisoprene, polybutadiene, polyisobutylene-co-isoprene, neoprene, poly(ethylene-co-propylene), poly(styrene-co-butadiene), poly(styrene-co-isoprene), poly(styrene-co-isoprene-co-butadiene), poly(isoprene-co-butadiene), poly(ethylene-co-propylene-co-diene), polysulfide rubber, acrylic rubber, urethane rubber, silicone rubber, epichlorohydrin rubber, and mixtures thereof. These elastomers can have a myriad of macromolecular structures including linear, branched, and star-shaped structures.

The rubber compositions may include fillers such as inorganic and organic fillers. Examples of organic fillers include carbon black and starch. Examples of inorganic fillers include silica, aluminum hydroxide, magnesium hydroxide, mica, talc (hydrated magnesium silicate), and clays (hydrated aluminum silicates). Carbon blacks and silicas are the most common fillers used in manufacturing tires. In certain embodiments, a mixture of different fillers may be advantageously employed.

In one or more embodiments, carbon blacks include furnace blacks, channel blacks, and lamp blacks. More specific examples of carbon blacks include super abrasion furnace blacks, intermediate super abrasion furnace blacks, high abrasion furnace blacks, fast extrusion furnace blacks, fine furnace blacks, semi-reinforcing furnace blacks, medium processing channel blacks, hard processing channel blacks, conducting channel blacks, and acetylene blacks.

In particular embodiments, the carbon blacks may have a surface area (EMSA) of at least 20 $m^2/g$ and in other embodiments at least 35 $m^2/g$; surface area values can be determined by ASTM D-1765 using the cetyltrimethylammonium bromide (CTAB) technique. The carbon blacks may be in a pelletized form or an unpelletized flocculent form. The preferred form of carbon black may depend upon the type of mixing equipment used to mix the rubber compound.

The amount of carbon black employed in the rubber compositions can be up to about 50 parts by weight per 100 parts by weight of rubber (phr), with about 5 to about 40 phr being typical.

Some commercially available silicas which may be used include Hi-Sil™ 215, Hi-Sil™ 233, and Hi-Sil™ 190 (PPG Industries, Inc.; Pittsburgh, Pa.). Other suppliers of commercially available silica include Grace Davison (Baltimore, Md.), Degussa Corp. (Parsippany, N.J.), Rhodia Silica Systems (Cranbury, N.J.), and J.M. Huber Corp. (Edison, N.J.).

In one or more embodiments, silicas may be characterized by their surface areas, which give a measure of their reinforcing character. The Brunauer, Emmet and Teller ("BET") method (described in *J. Am. Chem. Soc.*, vol. 60, p. 309 et seq.) is a recognized method for determining the surface area. The BET surface area of silica is generally less than 450 $m^2/g$. Useful ranges of surface area include from about 32 to about 400 $m^2/g$, about 100 to about 250 $m^2/g$, and about 150 to about 220 $m^2/g$.

The pH's of the silicas are generally from about 5 to about 7 or slightly over 7, or in other embodiments from about 5.5 to about 6.8.

In one or more embodiments, where silica is employed as a filler (alone or in combination with other fillers), a coupling agent and/or a shielding agent may be added to the rubber compositions during mixing in order to enhance the interaction of silica with the elastomers. Useful coupling agents and shielding agents are disclosed in U.S. Pat. Nos. 3,842,111, 3,873,489, 3,978,103, 3,997,581, 4,002,594, 5,580,919, 5,583,245, 5,663,396, 5,674,932, 5,684,171, 5,684,172, 5,696,197, 6,608,145, 6,667,362, 6,579,949, 6,590,017, 6,525,118, 6,342,552, and 6,683,135, which are incorporated herein by reference.

The amount of silica employed in the rubber compositions can be from about 1 to about 100 phr or in other embodiments from about 5 to about 80 phr. The useful upper range is limited by the high viscosity imparted by silicas. When silica is used together with carbon black, the amount of silica can be decreased to as low as about 1 phr; as the amount of silica is decreased, lesser amounts of coupling agents and shielding agents can be employed. Generally, the amounts of coupling agents and shielding agents range from about 4% to about 20% based on the weight of silica used.

A multitude of rubber curing agents (also called vulcanizing agents) may be employed, including sulfur or peroxide-based curing systems. Curing agents are described in *Kirk-Othmer, ENCYCLOPEDIA OF CHEMICAL TECHNOLOGY*, Vol. 20, pgs. 365-468, ($3^{rd}$ Ed. 1982), particularly *Vulcanization Agents and Auxiliary Materials*, pgs. 390-402, and A. Y. Coran, *Vulcanization, ENCYCLOPEDIA OF POLYMER SCIENCE AND ENGINEERING*, (2nd Ed. 1989), which are incorporated herein by reference. Vulcanizing agents may be used alone or in combination.

Other ingredients that are typically employed in rubber compounding may also be added to the rubber compositions. These include accelerators, accelerator activators, oils, plasticizer, waxes, scorch inhibiting agents, processing aids, zinc oxide, tackifying resins, reinforcing resins, fatty acids such as stearic acid, peptizers, and antidegradants such as antioxidants and antiozonants. In particular embodiments, the oils that are employed include those conventionally used as extender oils, which are described above.

All ingredients of the rubber compositions can be mixed with standard mixing equipment such as Banbury or Brabender mixers, extruders, kneaders, and two-rolled mills. In one or more embodiments, the ingredients are mixed in two or more stages. In the first stage (often referred to as the masterbatch mixing stage), a so-called masterbatch, which typically includes the rubber component and filler, is prepared. To prevent premature vulcanization (also known as scorch), the masterbatch may exclude vulcanizing agents. The masterbatch may be mixed at a starting temperature of from about 25° C. to about 125° C. with a discharge temperature of about 135° C. to about 180° C. Once the masterbatch is prepared, the vulcanizing agents may be introduced and mixed into the masterbatch in a final mixing stage, which is typically conducted at relatively low temperatures so as to reduce the chances of premature vulcanization. Optionally, additional mixing stages, sometimes called remills, can be employed between the masterbatch mixing stage and the final mixing stage. One or more remill stages are often employed where the rubber composition includes silica as the filler. Various ingredients including the polymers of this invention can be added during these remills.

The mixing procedures and conditions particularly applicable to silica-filled tire formulations are described in U.S. Pat. Nos. 5,227,425, 5,719,207, and 5,717,022, as well as European Patent No. 890,606, all of which are incorporated herein by reference. In one embodiment, the initial masterbatch is prepared by including the polymer of this invention and silica in the substantial absence of coupling agents and shielding agents.

The rubber compositions prepared from the polymers of this invention are particularly useful for forming tire components such as treads, subtreads, sidewalls, body ply skims, bead filler, and the like. Preferably, the polymers of this invention are employed in tread and sidewall formulations. In one or more embodiments, these tread or sidewall formulations may include from about 10% to about 100% by weight, in other embodiments from about 35% to about 90% by weight, and in other embodiments from about 50% to about 80% by weight of the polymer based on the total weight of the rubber within the formulation.

Where the rubber compositions are employed in the manufacture of tires, these compositions can be processed into tire components according to ordinary tire manufacturing techniques including standard rubber shaping, molding and curing techniques. Typically, vulcanization is effected by heating the vulcanizable composition in a mold; e.g., it may be heated to about 140° C. to about 180° C. Cured or crosslinked rubber compositions may be referred to as vulcanizates, which generally contain three-dimensional polymeric networks that are thermoset. The other ingredients, such as fillers and processing aids, may be evenly dispersed throughout the crosslinked network. Pneumatic tires can be made as discussed in U.S. Pat. Nos. 5,866,171, 5,876,527, 5,931,211, and 5,971,046, which are incorporated herein by reference.

In order to demonstrate the practice of the present invention, the following examples have been prepared and tested. The examples should not, however, be viewed as limiting the scope of the invention. The claims will serve to define the invention.

Experimental Section

EXAMPLE I (SAMPLES 1-8)

In order to demonstrate the beneficial properties observed when aged catalyst compositions are employed to prepare cis-1,4-polydienes, the following catalyst compositions were prepared and employed to synthesize polydienes.

Unless otherwise specified, the Mooney viscosities ($ML_{1+4}$) of the polymer samples were determined at 100° C. by using a Monsanto Mooney viscometer with a large rotor, a one-minute warm-up time, and a four-minute running time. The number average ($M_n$) and weight average ($M_w$) molecular weights of the polymer samples were determined by gel permeation chromatography (GPC). The GPC instrument was equipped with a differential refractive index (RI) detector and an ultraviolet (UV) absorption detector. The cis-1,4-linkage, trans-1,4-linkage, and 1,2-linkage contents of the polymer samples were determined by infrared spectroscopy. The GPC UV/RI ratio, which is the ratio of the UV detector signal to the RI detector signal, was used to calculate the % functionality of the polymer samples by referencing the GPC UV/RI ratio of the functionalized cis-1,4-polybutadiene to the UV/RI ratio of a functionalized polybutadiene sample that is produced by using anionic polymerization and has the same $M_n$. The cis-1,4-linkage, trans-1,4-linkage, and 1,2-linkage contents of the polymer samples were determined by infrared spectroscopy.

Sample 1

A nitrogen purged sealed glass vessel was charged with 95.2 g of anhydrous hexanes and 238.1 g of a 21.0 wt. % solution of butadiene in hexanes. To this mixture was added sequentially 0.94 mL of a 1.09 M diisobutylaluminum hydride solution in hexanes, 0.77 mL of a 0.11 M neodymium versatate solution in cyclohexanes, and 0.21 mL of a 0.43 M ethylaluminum sesquichloride solution in hexanes. The polymerization mixture was immediately placed in an agitating bath at 50° C. After 60 minutes of agitation, 2.10 mL of 0.80 M 4,4'-bis(diethylamino)benzophenone in toluene was charged to the polymerization mixture and agitation was continued at 65° C. After 30 minutes of agitation, the polymerization was terminated by charging the polymerization mixture with 3.0 mL of a 10 wt. % solution of 2,6-di-tert-butyl-4-methylphenol in isopropanol. The polymer was coagulated in 8 L of isopropanol containing 15 g of 2,6-di-tert-butyl-4-methylphenol and then drum-dried. For polymer characterization data, see Table I.

Catalysts A-F

Catalyst A (no catalyst aging): A catalyst solution was prepared by sequentially mixing 8.50 mL of a 0.11 M neodymium versatate solution in cyclohexanes, 10.79 mL of a 21.3 wt. % solution of butadiene in hexanes, 10.89 mL of a 1.03 M diisobutylaluminum hydride solution in hexanes, 2.17 mL of a 0.43 M ethylaluminum sesquichloride solution in hexanes, and 5.00 mL of hexanes. After addition of each individual chemical component to the catalyst mixture, the mixture was allowed to stand for 10 minutes.

Catalyst B (aged 1 day): A catalyst solution was prepared by sequentially mixing 8.50 mL of a 0.11 M neodymium versatate solution in cyclohexanes, 10.79 mL of a 21.3 wt. % solution of butadiene in hexanes, 10.89 mL of a 1.03 M diisobutylaluminum hydride solution in hexanes, 2.17 mL of a 0.43 M ethylaluminum sesquichloride solution in hexanes, and 5.00 mL of hexanes. After addition of each individual chemical component to the catalyst mixture, the mixture was allowed to stand for 10 minutes. The catalyst was aged for 1 day at room temperature.

Catalyst C (aged 7 days): A catalyst solution was prepared by sequentially mixing 23.18 mL of a 0.11 M neodymium versatate solution in cyclohexanes, 29.57 mL of a 21.2 wt. % solution of butadiene in hexanes, 29.71 mL of a 1.03 M diisobutylaluminum hydride solution in hexanes, 5.93 mL of a 0.43 M ethylaluminum sesquichloride solution in hexanes, and 13.75 mL of hexanes. After addition of each individual chemical component to the catalyst mixture, the mixture was allowed to stand for 10 minutes. The catalyst was aged for 7 days at room temperature.

Catalyst D (aged 12 days): A catalyst solution was prepared by sequentially mixing 23.18 mL of a 0.11 M neodymium versatate solution in cyclohexanes, 29.57 mL of a 21.2 wt. % solution of butadiene in hexanes, 29.71 mL of a 1.03 M diisobutylaluminum hydride solution in hexanes, 5.93 mL of a 0.43 M ethylaluminum sesquichloride solution in hexanes, and 13.75 mL of hexanes. After addition of each individual chemical component to the catalyst mixture, the mixture was allowed to stand for 10 minutes. The catalyst was aged for 12 days at room temperature.

Catalyst E (aged 15 days): A catalyst solution was prepared by sequentially mixing 23.18 mL of a 0.11 M neodymium versatate solution in cyclohexanes, 29.57 mL of a 21.2 wt. % solution of butadiene in hexanes, 29.71 mL of a 1.03 M diisobutylaluminum hydride solution in hexanes, 5.93 mL of a 0.43 M ethylaluminum sesquichloride solution in hexanes, and 13.75 mL of hexanes. After addition of each individual chemical component to the catalyst mixture, the mixture was allowed to stand for 10 minutes. The catalyst was aged for 15 days at room temperature.

Catalyst F (aged 20 days): A catalyst solution was prepared by sequentially mixing 23.18 mL of a 0.11 M neodymium versatate solution in cyclohexanes, 29.57 mL of a 21.2 wt. % solution of butadiene in hexanes, 29.71 mL of a 1.03 M diisobutylaluminum hydride solution in hexanes, 5.93 mL of a 0.43 M ethylaluminum sesquichloride solution in hexanes, and 13.75 mL of hexanes. After addition of each individual chemical component to the catalyst mixture, the mixture was allowed to stand for 10 minutes. The catalyst was aged for 20 days at room temperature.

Samples 2, 3, 6, and 7

A nitrogen purged sealed glass vessel was charged with 98.6 g of anhydrous hexanes and 234.7 g of a 21.3 wt. % solution of butadiene in hexanes. To this solution was added 3.40 mL of preformed catalysts A, B, E, or F. The polymerization mixture was immediately placed in an agitating bath at 50° C. After 60 minutes of agitation, 2.10 mL of 0.80 M 4,4'-bis(diethylamino)benzophenone in toluene was charged to the polymerization mixture and agitation was continued at 65° C. After 30 minutes of agitation, the polymerization was terminated by charging the polymerization mixture with 3.0 mL of a 10 wt. % solution of 2,6-di-tert-butyl-4-methylphenol in isopropanol. The polymer was coagulated in 8 L of isopropanol containing 15 g of 2,6-di-tert-butyl-4-methylphenol and then drum-dried. For polymer characterization data, see Table I.

Samples 4 and 5

A nitrogen purged sealed glass vessel was charged with 88.2 g of anhydrous hexanes and 245.1 g of a 20.4 wt. % solution of butadiene in hexanes. To this solution was added 3.40 mL of preformed catalysts C or D. The polymerization mixture was immediately placed in an agitating bath at 50° C. After 60 minutes of agitation, 2.10 mL of 0.80 M 4,4'-bis(diethylamino)benzophenone in toluene was charged to the polymerization mixture and agitation was continued at 65° C. After 30 minutes of agitation, the polymerization was terminated by charging the polymerization mixture with 3.0 mL of a 10 wt. % solution of 2,6-di-tert-butyl-4-methylphenol in isopropanol. The polymer was coagulated in 8 L of isopropanol containing 15 g of 2,6-di-tert-butyl-4-methylphenol and then drum-dried. For polymer characterization data, see Table I.

TABLE I

| Sample | 1 | 2 | 3 | 4 | 5 | 6 | 7 |
|---|---|---|---|---|---|---|---|
| Method | In Situ | Preformed | Preformed | Preformed | Preformed | Preformed | Preformed |
| Aging @ RT | n/a | 0 d | 1 d | 7 d | 12 d | 15 d | 20 d |
| Conversion (%) | 94 | 99 | >99 | >99 | >99 | >99 | >99 |
| $ML_{1+4}$ | 25.8 | 15.7 | 16.1 | 33.0 | 41.7 | 43.9 | 58.5 |
| $t_{80}$ | 3.54 | 1.58 | 1.72 | 1.57 | 1.84 | 1.87 | 2.18 |
| Cis (%) | 98.0 | 95.3 | 95.8 | 95.6 | 96.2 | 96.4 | 97.1 |
| Trans (%) | 1.4 | 4.1 | 3.7 | 3.9 | 3.3 | 3.2 | 2.4 |
| Vinyl (%) | 0.6 | 0.6 | 0.5 | 0.5 | 0.5 | 0.5 | 0.5 |
| $M_n$ (k) | 77.6 | 83.9 | 93.3 | 124.1 | 127.8 | 133.0 | 141.7 |
| $M_w$ (k) | 367.0 | 225.8 | 213.4 | 238.5 | 258.7 | 260.2 | 291.2 |
| $M_p$ (k) | 83.5 | 122.7 | 127.0 | 165.3 | 172.8 | 174.0 | 187.7 |
| $M_w/M_n$ | 4.73 | 2.69 | 2.29 | 1.92 | 2.02 | 1.96 | 2.06 |
| ME (%) | 15.5 | 37.1 | 39.8 | 43.3 | 50.5 | 45.1 | 41.0 |

The data in Table I shows that functionality (a.k.a. modification efficiency; ME), as represented by ME %, was significantly improved upon catalyst aging. Also, functionality reached an unexpected peak between about 7 and 15 days of aging at room temperature. Aging also provided advantageous molecular weight distribution. Still further, the data in Table I shows the trend that cis-1,4-linkage content increases with aging. Finally, it should be noted that Mooney viscosity increases with aging of the catalyst.

EXAMPLE II (SAMPLES 8-14)

In order to demonstrate the beneficial properties observed when aged catalyst compositions are treated with additional alkylating agent, the following catalyst compositions were prepared and employed to synthesize polydienes.

A preformed catalyst solution was prepared by sequentially mixing 11.76 mL of a 20.1 wt. % solution of butadiene in hexanes, 2.69 mL of a 0.54 M neodymium versatate solution in cyclohexanes, and 13.38 mL of a 1.08 M diisobutylaluminum hydride solution in hexanes. The mixture was allowed to stand at room temperature for 3 minutes and then 2.17 mL of a 1.00 M ethylaluminum dichloride solution in hexanes was added. After an additional 10 minutes of aging at room temperature the catalyst mixture was diluted with 4.00 mL of hexanes.

Sample 8

A nitrogen purged sealed glass vessel was charged with 84.6 g of anhydrous hexanes and 248.8 g of a 20.1 wt. % solution of butadiene in hexanes. To this solution was added 2.00 mL of the preformed catalyst described in Example 1 that had been aged for 10 minutes at room temperature. The polymerization mixture was immediately placed in an agitating bath at 50° C. After 60 minutes of agitation, the polymerization mixture was functionalized by charging 2.07 mL of a 0.82 M 4,4'-bis(diethylamino)benzophenone solution in toluene and allowing the polymerization solution to agitate for 60 minutes at 80° C. The polymerization was terminated by diluting the polymerization mixture with 3.0 ml of a 10 wt. % solution of 2,6-di-tert-butyl-4-methylphenol in isopropanol. The polymer was coagulated in 8 L of isopropanol containing 15 g of 2,6-di-tert-butyl-4-methylphenol and then drum-dried. For polymer characterization data, see Table II.

Sample 9

A nitrogen purged sealed glass vessel was charged with 84.6 g of anhydrous hexanes and 248.8 g of a 20.1 wt. % solution of butadiene in hexanes. To this solution was added 2.00 mL of the preformed catalyst described in Example 1 that had been aged for 4 hours at room temperature. The polymerization mixture was immediately placed in an agitating bath at 50° C. After 60 minutes of agitation, the polymerization mixture was functionalized by charging 2.07 mL of a 0.82 M 4,4'-bis(diethylamino)benzophenone solution in toluene and allowing the polymerization solution to agitate for 60 minutes at 80° C. The polymerization was terminated by diluting the polymerization mixture with 3.0 ml of a 10 wt. % solution of 2,6-di-tert-butyl-4-methylphenol in isopropanol. The polymer was coagulated in 8 L of isopropanol containing 15 g of 2,6-di-tert-butyl-4-methylphenol and then drum-dried. For polymer characterization data, see Table II.

Sample 10

A nitrogen purged sealed glass vessel was charged with 84.6 g of anhydrous hexanes and 248.8 g of a 20.1 wt. % solution of butadiene in hexanes. To this solution was added 2.00 mL of the preformed catalyst described in Example 1 that had been aged for 24 hours at room temperature. The polymerization mixture was immediately placed in an agitating bath at 50° C. After 60 minutes of agitation, the polymerization mixture was functionalized by charging 2.07 mL of a 0.82 M 4,4'-bis(diethylamino)benzophenone solution in toluene and allowing the polymerization solution to agitate for 60 minutes at 80° C. The polymerization was terminated by diluting the polymerization mixture with 3.0 ml of a 10 wt. % solution of 2,6-di-tert-butyl-4-methylphenol in isopropanol. The polymer was coagulated in 8 L of isopropanol containing 15 g of 2,6-di-tert-butyl-4-methylphenol and then drum-dried. For polymer characterization data, see Table II.

Sample 11

A nitrogen purged sealed glass vessel was charged with 83.3 g of anhydrous hexanes and 250.0 g of a 20.0 wt. % solution of butadiene in hexanes. To this solution was added sequentially 0.39 mL of a 1.08 M diisobutyl aluminum hydride solution in hexanes and 2.00 mL of the preformed catalyst described in Example 1 that had been aged for 7 days at room temperature. The polymerization mixture was immediately placed in an agitating bath at 50° C. After 60 minutes of agitation, the polymerization mixture was functionalized by charging 2.07 mL of a 0.82 M 4,4'-bis(diethylamino)benzophenone solution in toluene and allowing the polymerization solution to agitate for 60 minutes at 80° C. The polymerization was terminated by diluting the polymerization mixture with 3.0 ml of a 10 wt. % solution of 2,6-di-tert-butyl-4-methylphenol in isopropanol. The polymer was coagulated in 8 L of isopropanol containing 15 g of 2,6-di-tert-butyl-4-methylphenol and then drum-dried. For polymer characterization data, see Table II.

Sample 12

A nitrogen purged sealed glass vessel was charged with 83.3 g of anhydrous hexanes and 250.0 g of a 20.0 wt. % solution of butadiene in hexanes. To this solution was added sequentially 0.79 mL of a 1.08 M diisobutyl aluminum hydride solution in hexanes and 2.00 mL of the preformed catalyst described in Example 1 that had been aged for 7 days at room temperature. The polymerization mixture was immediately placed in an agitating bath at 50° C. After 60 minutes of agitation, the polymerization mixture was functionalized by charging 2.07 mL of a 0.82 M 4,4'-bis(diethylamino)benzophenone solution in toluene and allowing the polymerization solution to agitate for 60 minutes at 80° C. The polymerization was terminated by diluting the polymerization mixture with 3.0 ml of a 10 wt. % solution of 2,6-di-tert-butyl-4-methylphenol in isopropanol. The polymer was coagulated in 8 L of isopropanol containing 15 g of 2,6-di-tert-butyl-4-methylphenol and then drum-dried. For polymer characterization data, see Table II.

Sample 13

A nitrogen purged sealed glass vessel was charged with 83.3 g of anhydrous hexanes and 250.0 g of a 20.0 wt. % solution of butadiene in hexanes. To this solution was added sequentially 0.39 mL of a 1.08 M diisobutyl aluminum hydride solution in hexanes and 2.00 mL of the preformed catalyst described in Example 1 that had been aged for 30 days at room temperature. The polymerization mixture was immediately placed in an agitating bath at 50° C. After 60 minutes of agitation, the polymerization mixture was functionalized by charging 2.07 mL of a 0.82 M 4,4'-bis(diethylamino)benzophenone solution in toluene and allowing the polymerization solution to agitate for 60 minutes at 80° C. The polymerization was terminated by diluting the polymerization mixture with 3.0 ml of a 10 wt. % solution of 2,6-di-tert-butyl-4-methylphenol in isopropanol. The polymer was coagulated in 8 L of isopropanol containing 15 g of 2,6-di-tert-butyl-4-methylphenol and then drum-dried. For polymer characterization data, see Table II.

Sample 14

A nitrogen purged sealed glass vessel was charged with 83.3 g of anhydrous hexanes and 250.0 g of a 20.0 wt. % solution of butadiene in hexanes. To this solution was added sequentially 0.79 mL of a 1.08 M diisobutyl aluminum hydride solution in hexanes and 2.00 mL of the preformed catalyst described above in Example II that had been aged for 30 days at room temperature. The polymerization mixture was immediately placed in an agitating bath at 50° C. After 60 minutes of agitation, the polymerization mixture was functionalized by charging 2.07 mL of a 0.82 M 4,4'-bis(diethylamino)benzophenone solution in toluene and allowing the polymerization solution to agitate for 60 minutes at 80° C. The polymerization was terminated by diluting the polymerization mixture with 3.0 ml of a 10 wt. % solution of 2,6-di-tert-butyl-4-methylphenol in isopropanol. The polymer was coagulated in 8 L of isopropanol containing 15 g of 2,6-di-tert-butyl-4-methylphenol and then drum-dried. For polymer characterization data, see Table II.

TABLE II

| Example No. | 8 | 9 | 10 | 11 | 12 | 13 | 14 |
| --- | --- | --- | --- | --- | --- | --- | --- |
| Catalyst Age @ 23° C. | 10 min | 4 h | 24 h | 7 d | 7 d | 30 d | 30 d |
| Additional Alkylating Agent | 0 | 0 | 0 | 5 | 10 | 5 | 10 |
| Conv. (%) | 97.8 | >99 | >99 | >99 | 98 | 98.2 | 90.6 |

TABLE II-continued

| Example No. | 8 | 9 | 10 | 11 | 12 | 13 | 14 |
|---|---|---|---|---|---|---|---|
| $ML_{1+4}$ | 55.5 | 59.3 | 76.1 | 19.2 | 7.8 | 51 | 13.2 |
| $t_{80}$ | 3.16 | 3.22 | 3.59 | 2.46 | 2.48 | 3.16 | 3.12 |
| GPC (BR Universal Standard) | | | | | | | |
| $M_n$ (×10³) (g/mol) | 132.6 | 143.3 | 164 | 94 | 61.6 | 137.8 | 69.9 |
| $M_w$ (×10³) (g/mol) | 408.2 | 406.1 | 459.8 | 285.2 | 223.7 | 403.7 | 243.8 |
| $M_w/M_n$ | 3.08 | 2.83 | 2.8 | 3.03 | 3.63 | 2.93 | 3.49 |
| % Cis | 98.11 | 98.11 | 98.52 | 97.02 | 96.14 | 98.26 | 97.17 |
| % Trans | 1.63 | 1.56 | 1.23 | 2.45 | 3.28 | 1.22 | 2.25 |
| % Vinyl | 0.26 | 0.33 | 0.25 | 0.53 | 0.58 | 0.52 | 0.58 |
| % Functionality | 29 | 27 | 31 | 45 | 43 | 33 | 38 |

Table II shows the same trend shown Table I where peak functionality is observed between 7 and 15 days. The data also shows an increase in cis-1,4-linkage content at comparable Mooney viscosity. At the same the time, the data shows that the Mooney viscosity can be adjusted by the addition of alkylating agent. The use of excessive alkylating agent after aging, however, can have a deleterious impact on properties. Thus, the data suggests that the cis-1,4-linkage content can be increased while allowing for the Mooney viscosity to be maintained within desirable ranges. Also, where appropriate amounts of alkylating agent are introduced after aging, narrower molecular weight can be obtained with aging.

EXAMPLE III (SAMPLES 15-20)

In order to demonstrate the beneficial properties observed when aged catalyst compositions are treated with additional alkylating agent, the following catalyst compositions were prepared and employed to synthesize polydienes.

Catalyst AA (No Catalyst Aging):

A catalyst solution was prepared by sequentially mixing 8.50 mL of a 0.11 M neodymium versatate solution in cyclohexanes, 10.79 mL of a 21.3 wt. % solution of butadiene in hexanes, 10.89 mL of a 1.03 M diisobutylaluminum hydride solution in hexanes, 2.46 mL of a 0.43 M ethylaluminum sesquichloride solution in hexanes, and 4.75 mL of hexanes. After addition of each individual chemical component to the catalyst mixture, the mixture was allowed to stand for 10 minutes.

Catalyst BB (Aged 7 Days):

A catalyst solution was prepared by sequentially mixing 8.50 mL of a 0.11 M neodymium versatate solution in cyclohexanes, 10.79 mL of a 21.3 wt. % solution of butadiene in hexanes, 10.89 mL of a 1.03 M diisobutylaluminum hydride solution in hexanes, 2.46 mL of a 0.43 M ethylaluminum sesquichloride solution in hexanes, and 4.75 mL of hexanes. After addition of each individual chemical component to the catalyst mixture, the mixture was allowed to stand for 10 minutes. The catalyst was aged for 7 days at room temperature.

Catalyst CC (Aged 6 Months at −30° C.):

A catalyst solution was prepared by sequentially mixing 8.50 mL of a 0.11 M neodymium versatate solution in cyclohexanes, 10.79 mL of a 21.3 wt. % solution of butadiene in hexanes, 10.89 mL of a 1.03 M diisobutylaluminum hydride solution in hexanes, 2.46 mL of a 0.43 M ethylaluminum sesquichloride solution in hexanes, and 4.75 mL of hexanes. After addition of each individual chemical component to the catalyst mixture, the mixture was allowed to stand for 10 minutes. The catalyst was aged for 7 days at room temperature and for 6 months at −30° C.

Samples 15 & 16

A nitrogen purged sealed glass vessel was charged with 98.6 g of anhydrous hexanes and 234.7 g of a 21.3 wt. % solution of butadiene in hexanes. To this solution was added 3.40 mL of preformed catalysts AA and BB. The polymerization mixture was immediately placed in an agitating bath at 50° C. After 60 min of agitation, the polymerization was terminated by charging the polymerization mixture with 3.0 mL of a 10 wt. % solution of 2,6-di-tert-butyl-4-methylphenol in isopropanol. The polymer was coagulated in 8 L of isopropanol containing 15 g of 2,6-di-tert-butyl-4-methylphenol and then drum-dried. For polymer characterization data, see Table III.

Sample 17

A nitrogen purged sealed glass vessel was charged with 95.2 g of anhydrous hexanes and 238.1 g of a 21.0 wt. % solution of butadiene in hexanes. To this solution was added 3.40 mL of preformed catalyst CC. The polymerization mixture was immediately placed in an agitating bath at 50° C. After 60 min of agitation, the polymerization was terminated by charging the polymerization mixture with 3.0 mL of a 10 wt. % solution of 2,6-di-tert-butyl-4-methylphenol in isopropanol. The polymer was coagulated in 8 L of isopropanol containing 15 g of 2,6-di-tert-butyl-4-methylphenol and then drum-dried. For polymer characterization data, see Table III.

Sample 18

A nitrogen purged sealed glass vessel was charged with 95.2 g of anhydrous hexanes and 238.1 g of a 21.0 wt. % solution of butadiene in hexanes. To this solution was first added 80 mL of a 1.09 M diisobutylaluminum hydride solution in hexanes, followed by 3.40 mL of preformed catalyst CC. The polymerization mixture was immediately placed in an agitating bath at 50° C. After 60 minutes of agitation, the polymerization was terminated by charging the polymerization mixture with 3.0 mL of a 10 wt. % solution of 2,6-di-tert-butyl-4-methylphenol in isopropanol. The polymer was coagulated in 8 L of isopropanol containing 15 g of 2,6-di-tert-butyl-4-methylphenol and then drum-dried. For polymer characterization data, see Table III.

TABLE III

| Example | 15 | 16 | 17 | 18 |
|---|---|---|---|---|
| Aging at rt | 0 | 7 d | 7 d | 7 d |
| Aging at −30° C. | 0 | 0 | ~6 mos | ~6 mos |
| Al:Nd | 0 | 0 | 0 | 1.0 |
| Conversion (%) | >99 | >99 | 95 | 94 |
| $ML_{1+4}$ | 16.2 | 26.5 | 26.4 | 18.2 |
| $t_{80}$ | 1.91 | 1.80 | 1.85 | 1.47 |
| Cis (%) | 95.74 | 95.63 | 96.33 | 95.97 |
| Trans (%) | 3.74 | 3.90 | 3.17 | 3.54 |
| Vinyl (%) | 0.52 | 0.47 | 0.49 | 0.49 |
| $M_n$ (k) | 85.5 | 113.5 | 111.8 | 89.4 |

TABLE III-continued

| Example | 15 | 16 | 17 | 18 |
|---|---|---|---|---|
| $M_w$ (k) | 226.1 | 229.0 | 230.4 | 199.4 |
| $M_p$ (k) | 127.9 | 153.8 | 150.3 | 132.9 |
| $M_w/M_n$ | 2.64 | 2.02 | 2.06 | 2.23 |

Table III shows an increase in cis-1,4-linkage content at comparable Mooney viscosity. At the same time, the data shows that the Mooney viscosity can be adjusted by the addition of alkylating agent. Thus, the data suggests that the cis-1,4-linkage content can be increased while allowing for the Mooney viscosity to be maintained within desirable ranges. Also, where appropriate amounts of alkylating agent are introduced after aging, narrower molecular weight can be obtained with aging. Finally, the data in Table III shows that the catalyst compositions can be aged at colder temperatures without significantly impacting properties.

Various modifications and alterations that do not depart from the scope and spirit of this invention will become apparent to those skilled in the art. This invention is not to be duly limited to the illustrative embodiments set forth herein.

What is claimed is:

1. A method for preparing a functionalized polymer, the method comprising:
    (a) preparing a catalyst composition by combining a lanthanide-containing compound, an alkylating agent, and a halogen source;
    (b) aging the catalyst composition to form an aged catalyst composition, where said step of aging includes aging for from 12 days to 15 days, where said step of aging the catalyst composition consists only of aging the catalyst composition prior to combining the aged catalyst composition with additional alkylating agent;
    (c) combining the aged catalyst composition with additional alkylating agent to thereby form a premixture of the aged catalyst system and the additional alkylating agent;
    (d) combining the premixture of the aged catalyst system and the additional alkylating agent with conjugated diene monomer to be polymerized to form a polymerization system that produces a polydiene having a reactive chain end, wherein said step of combining the premixture of the aged catalyst system and the additional alkylating agent with the conjugated diene monomer to be polymerized occurs within 24 hours of said forming the premixture of the aged catalyst system and the additional alkylating agent;
    wherein an amount of total aluminum employed in the aged catalyst composition relative to a total amount of the conjugated diene monomer is less than 5 mmol per 100 grams of the conjugated diene monomer, where said step of combining the premixture of the aged catalyst system and the additional alkylating agent with the conjugated diene monomer to be polymerized includes combining from about 0.001 to about 2 mmol of the lanthanide-containing compound per 100 grams of the conjugated diene monomer to be polymerized; and
    (e) introducing a functionalizing agent to the polymerization system to thereby prepare the functionalized polymer.

2. The method of claim 1, where said step of preparing a catalyst composition includes combining from about 1 to about 100 moles conjugated diene monomer with the lanthanide-containing compound, the alkylating agent, and the halogen source.

3. The method of claim 1, where said step of aging includes aging at a temperature of at least 20° C. and at most 40° C.

4. The method of claim 1, where said step of preparing a catalyst composition includes combining neodymium neodecanoate, diisobutylaluminum hydride, and ethylaluminum sesquichloride.

5. The method of claim 1, where said polymerization system is controlled to maintain a temperature of within a range from about 0° C. to about 150° C.

6. The method of claim 1, where the amount of total aluminum employed in the aged catalyst composition relative to the total amount of the conjugated diene monomer is from about 1 mmol to about 4.5 mmol per 100 grams of the conjugated diene monomer.

7. The method of claim 1, where at least 40% of a total amount of polymer chains of the functionalized polymer possess a functional end group.

8. The method of claim 7, where the functionalized polymer has a Mooney viscosity ($ML_{1+4}$@100° C.) of 51 or less, where the functionalized polymer has a number average molecular weight of 137.8 kg/mol or less.

9. The method of claim 1, where the additional alkylating agent comprises an aluminoxane compound or an organomagnesium compound.

10. The method of claim 1, wherein said step of combining the premixture of the aged catalyst system and the additional alkylating agent with the conjugated diene monomer to be polymerized occurs within 1 hour of said forming the premixture of the aged catalyst system and the additional alkylating agent.

11. The method of claim 1, wherein an amount of the additional alkylating agent within the premixture of the aged catalyst system and the additional alkylating agent is a molar ratio of from about 0.8:1 to about 20:1 of the additional alkylating agent to the lanthanide-containing compound within the aged catalyst system.

12. The method of claim 1, wherein said step of combining the premixture of the aged catalyst system and the additional alkylating agent with the conjugated diene monomer to be polymerized occurs within 15 minutes of said forming the premixture of the aged catalyst system and the additional alkylating agent.

13. The method of claim 1, wherein said step of combining the premixture of the aged catalyst system and the additional alkylating agent with the conjugated diene monomer to be polymerized occurs within 1 minute of said forming the premixture of the aged catalyst system and the additional alkylating agent.

* * * * *